US008189428B2

(12) United States Patent
Orlin et al.

(10) Patent No.: US 8,189,428 B2
(45) Date of Patent: May 29, 2012

(54) METHODS AND SYSTEMS TO DETECT CHANGES IN MULTIPLE-FREQUENCY BAND SONAR DATA

(75) Inventors: David J. Orlin, Westminster, MD (US); Kenneth M. Fischer, New Market, MD (US); Franz J. Riggieri, Catonsville, MD (US); Derek C. Fulk, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 399 days.

(21) Appl. No.: 12/536,609

(22) Filed: Aug. 6, 2009

(65) Prior Publication Data
US 2010/0046327 A1 Feb. 25, 2010

Related U.S. Application Data

(60) Provisional application No. 61/086,559, filed on Aug. 6, 2008.

(51) Int. Cl.
*G01S 15/00* (2006.01)
(52) U.S. Cl. ........................................... 367/88
(58) Field of Classification Search ............ 367/88, 367/93
See application file for complete search history.

(56) References Cited

U.S. PATENT DOCUMENTS

| 7,990,804 | B2 * | 8/2011 | Gendron et al. | ........ 367/88 |
| 2009/0016161 | A1 | 1/2009 | Gendron et al. | |

OTHER PUBLICATIONS

Tax et al., "Support Vector Data Description", Machine LEarning, vol. 54, No. 1, pp. 45-66, 2004.*
M. Carlotto, "A Cluster-Based Approach for Detecting Man-Made Objects and Changes in Imagery," IEEE Trans. Geoscience and Remote Sensing, 43(2): 374-387, 2005.
M. Gendron, et al., "Automatic Change Detection and Classification (ACDC) System," Proc. Sixth Int. Symp. on Technology and the Mine Problem, Naval Postgraduate School: Monterey, CA, 1-9, 2004.
R. J. Radke, et al., "Image Change Detection Algorithms: A Systematic Survey," IEEE Trans. Image Processing, 14 (3): 294-307, 2005.
X. Dai and S. Khorram, "The Effects of Image Misregistration on the Accuracy of Remotely Sensed Change Detection," IEEE Trans. Geoscience and Remote Sensing, 36(5): 1566-1577, 1998.
D. A. Stow "Reducing the Effects of Misregistration on Pixel Level Change Detection," Int. J. Remote Sensing, 20 (12): 2477-2483, 1999.
L. Bruzzone and R. Cossu, "An Adaptive Approach to Reducing Registration Noise Effects in Unsupervised Change Detection," IEEE Trans. Geoscience and Remote Sensing, 41(6): 2455-2465, 2003.

(Continued)

*Primary Examiner* — Ian Lobo
(74) *Attorney, Agent, or Firm* — Noah J. Hayward

(57) ABSTRACT

Methods and systems to detect changes in a region of space relative to baseline measurements, including to process data to detect potential objects, or contacts against a natural background environment, to characterize and geo-register the contacts, to compare and correlate the contacts with a database of known objects, and to report uncorrelated contacts as new objects in the space. Features disclosed herein may be implemented to process image data from a line-by-line image-generation system including, for example, side-looking sonar. Methods and system may be implemented with respect to multi-frequency band sonar data.

20 Claims, 13 Drawing Sheets

OTHER PUBLICATIONS

A. Banerjee, P. Burlina, and C. Diehl, "A Support Vector Method for Anomaly Detection in Hyperspectral Imagery," IEEE Trans. Geoscience and Remote Sensing, 44(8): 2282-2291, 2006.

D. M. J. Tax and R. P. W. Duin, "Support Vector Domain Description," Pattern Recognition Letters, 20: 1191-1199, 1999.

Edgetech Inc. (author unknown), "4200 Series Side Scan Sonar Systems," Product Brochure, available online at http://www.edgetech.com/brochureMarine/4200 Series Brochure 100606.pdf, Oct. 6, 2006.

R. E. Crochiere and L. R. Rabiner, Multi-Rate Signal Processing, Prentice-Hall: Englewood Cliffs, NJ, 1983, pp. 88-91.

Author Unknown, "Universal Transverse Mercator Coordinate System," available online at http://en.wikipedia.org/wiki/Universal_Transverse_Mercator_coordinate_system, 1-5, last accessed Jan. 18, 2010.

J. F. Canny, "A Computational Approach to Edge Detection," IEEE Trans. Pattern Matching and Machine Intelligence, 8(6): 679-698, 1986.

H. Stark and P. Oskoui, "High Resolution Image Recovery from Image-Plane Arrays Using Convex Projections," J. Opt. Soc. Am. A, 6, 1715-1726, 1989.

S. Lee, G. G Walberg, and S. Y. Shin, "Scattered Data Interpolation with Multilevel B-Splines," IEEE Trans. Visualization and Computer Graphics, 3(3): 1-17, 1997.

D. G. Lowe, "Distinctive Image Features from Scale-Invariant Keypoints," Int. J. Computer Vision, 60(2): 1-28, 2004.

M. Kass, A. Witkin, and D. Terzopoulos, "Snakes: Active Contour Models," Proc. First Int. Conf. Computer . Vision, 321-331, 1987.

C. C. H. Lean, A. K. B. See, and S. A. Shanmugam, "An Enhanced Method for the Snake Algorithm," Proc. First Int. Conf. Innovative Computing, Information, and Control, 2006.

S. Marshall, "Review of Shape Coding Techniques," Image and Vision Computing, 7(4): 281-294, Nov. 1989.

M. Peura and J. Iivarinen, "Efficiency of Simple Shape Descriptors," 3rd Int. Workshop on Visual Form, Capri, Italy, 1-9, May 1997.

N. Chernov, and C. Lesort, "Least Squares Fitting of Circles and Lines," J. Mathematical Imaging and Vision, 23: 1-25, 2002.

D. Marquardt, "An Algorithm for Least Squares Estimation on Nonlinear Parameters," SIAM J. Applied Mathematics, 11:431-441, 1963.

H. W. Kuhn, "The Hungarian Method for the Assignment Problem," Naval Research Logistic Quarterly, 2: 83-97, 1955.

H. W. Kuhn, "Variants of the Hungarian Method for Assignment Problems," Naval Research Logistic Quarterly, 3: 253-258, 1956.

J. Munkres, "Algorithms for the Assignment and Transportation Problems," J. Soc. Industrial and Applied Mathematics, 5(1): 32-38, 1957.

F. Burgeois and J. C. Lassalle, "An Extension of the Munkres Algorithm for the Assignment Problem to Rectangular Matrices," Comm. ACM, 14: 802-804, 1971.

S. S. Blackman, "Multiple-Target Tracking with Radar Applications," Artech House: Norwood, MA, 1986, pp. 397-401.

Zhi-Li Wu, et al. "Location Estimation via Support Vector Regression," IEEE Transactions on Mobile Computing, vol. 6, No. 3, 311-321, Mar. 2007.

* cited by examiner

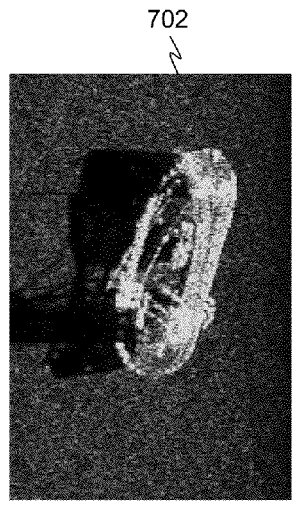
FIG. 7A
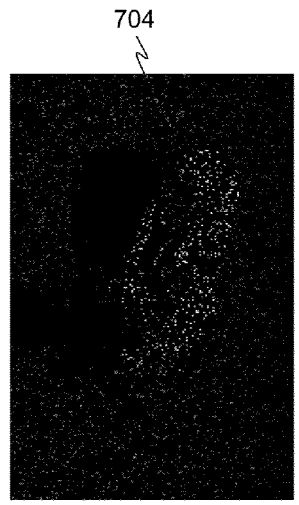
FIG. 7B
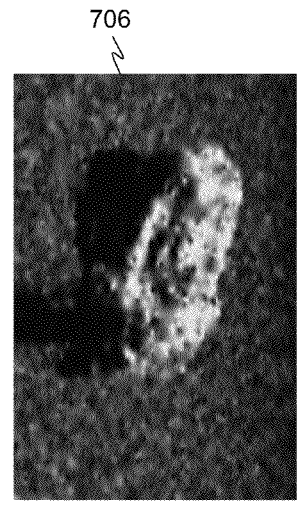
FIG. 7C
FIG. 8A
FIG. 8B
FIG. 8C
FIG. 8D
FIG. 8E
FIG. 8F

METHODS AND SYSTEMS TO DETECT CHANGES IN MULTIPLE-FREQUENCY BAND SONAR DATA

CROSS REFERENCE TO RELATED APPLICATIONS

This application claims the benefit of U.S. Provisional Patent Application No. 61/086,559, filed on Aug. 6, 2008, which is incorporated herein by reference in its entirety.

STATEMENT OF GOVERNMENTAL INTEREST

This invention was made with U.S. Government support under the Naval Sea Systems Command, contract number N00024-03-D-6606. The U.S. Government has certain rights in the invention.

TECHNICAL FIELD

Methods and systems disclosed herein are directed to detection of changes in a region of space relative to baseline measurements, including detection of changes in multiple-frequency band sonar data.

RELATED ART

Sonar images of an underwater area may be used to identify objects in the area. Subsequent sonar images of the area may be used to re-identify objects in the area, which may be compared to the previously identify objects. New objects may be presented to an operator for evaluation.

Sonar images of an underwater area may include relatively vast numbers of non-overlapping target-sized patches of seafloor, any of which may include an object of potential interest. In some situations, there may be a need to present newly identified objects for human evaluation in real-time. The potentially vast quantity of data may, however, render it impractical for humans to detect objects in sonar images, to correlate the detected objects with previously identified objects, and to identify new objects, in real-time.

Computer based techniques have been developed to detect object changes in sonar images.

The U.S. Naval Research Laboratory, of Washington D.C., has developed techniques as taught in U.S. Patent Publication No. 2009/0016161, titled, "Method and System for Real-Time Automated Change Detection and Classification for Images" (hereinafter, NRL). The abstract of NRL provides: "A computer based system and method for real-time display of co-registered historical and current side scan sonar imagery during a side scan sonar survey. Embodiments also include modules for detection of clutter in the current imagery, identification of features, extraction of snippets, filtering based on predetermined size and shape parameters, and determination if a current feature is the same as a previously identified contact from historical imagery."

Mine counter-measure (MCM) techniques have been developed to classify objects as mines or non-mines using automation to detect points of interest. Human beings make final classification decisions. MCM techniques are addressed in Reference 2 below. The shape, size, and acoustic characteristics of a wide variety of mine types are known, or at least knowable. For a given operating environment, certain types of mines may be expected. Therefore, MCM software has the advantage of knowing to a level of certainty what targets look like in acoustic data, while rocks, tires, barrels, and other objects represent undesirable clutter. MCM software is designed to distinguish mines from clutter objects, which is a multiclass classification problem. By their nature, objects may take any shape or size. Objects that are clutter for the MCM software may, however, be objects of interest in other situations.

Change detection may be performed at pixel-level or object-level. Pixel-level and object-level processing are addressed in Reference 3 below.

In object-level processing, entities, such as rocks, tires, and barrels, are first detected as contacts and then correlated with a database of known objects to detect new ones. There are a number of known techniques to identify objects. In some techniques, pixels corresponding to objects are distinguished from background pixels and are logically clustered. Each cluster represents a contact. Some techniques incorporate heuristics to determine contact boundaries and characteristics to verify detection. Contacts are then compared and correlated with a list of known objects. Uncorrelated contacts represent changes. An object-level change detection approach is addressed in Reference 1 below.

In contrast, pixel-level processing involves comparing sonar data sample by sample (each sample is a "pixel") to look for changes, and then clustering or otherwise describing these changes in a way that can indicate the presence of a new object.

Pixel-level processing requires a relatively high degree of registration to perform the comparison. In other words, the pixels must represent the same physical patch of ground. At centimeter resolution, the allowable errors in measuring sensor pitch, heading, and location become extremely small. For example, registering a 1 centimeter (cm) pixel at a 75-m range requires a heading accuracy of better than 0.1 mrad and, obviously, a geo-location accuracy of less than 1 cm. Due to the high-aspect dependency of the scattering surfaces, the sensor path must be followed exactly. A few meters difference in depth or cross-track positioning may compromise the data. Warping the sonar data with image-processing techniques may not accurately describe areas that were not actually covered by the sensor, referred to herein as inter-beam holiday regions, and may not sufficiently eliminate intra-image distortions resulting from unknowable sensor heading and location errors. Such registration requirements may render pixel-level processing unfeasible for many applications.

Issues associated with pixel-level registration and potential compensation techniques are addressed in References 4 through 6, below.

The following are incorporated herein by reference in their entireties:

M. Carlotto, "A Cluster-Based Approach for Detecting Man-Made Objects and Changes in Imagery," IEEE Trans. Geoscience and Remote Sensing, 43(2): 374-387, 2005, (hereinafter, Reference 1);

M. Gendron, et al., "Automatic Change Detection and Classification (ACDC) System," Proc. Sixth Int. Symp. on Technology and the Mine Problem, Naval Postgraduate School Monterey, Calif., 2004, (hereinafter, Reference 2);

R. J. Radke, et al., "Image Change Detection Algorithms: A Systematic Survey," IEEE Trans. Image Processing, 14(3): 294-307, 2005, (hereinafter, Reference 3);

X. Dai and S. Khorram, "The Effects of Image Misregistration on the Accuracy of Remotely Sensed Change Detection," IEEE Trans. Geoscience and Remote Sensing, 36(5): 1566-1577, 1998, (hereinafter, Reference 4);

D. A. Stow, "Reducing the Effects of Misregistration on Pixel Level Change Detection," Int. J. Remote Sensing, 20(12): 2477-2483, 1999, (hereinafter, Reference 5);

L. Bruzzone and R. Cossu, "An Adaptive Approach to Reducing Registration Noise Effects in Unsupervised Change Detection," IEEE Trans. Geoscience and Remote Sensing, 41(6): 2455-2465, 2003, (hereinafter, Reference 6);

A. Banerjee, P. Burlina, and C. Diehl, "A Support Vector Method for Anomaly Detection in Hyperspectral Imagery," IEEE Trans. Geoscience and Remote Sensing, 44(8): 2282-2291, 2006, (hereinafter, Reference 7);

D. M. J. Tax and R. P. W. Duin, "Support Vector Domain Description," Pattern Recognition Letters, 20: 1191-1199, 1999, (hereinafter, Reference 8);

Edgetech Inc., "4200 Series Side Scan Sonar Systems," Product Brochure, http://www.edgetech.com/brochureMarine/4200 Series Brochure 100606.pdf, Oct. 6, 2006, (hereinafter, Reference 9);

R. E. Crochiere and L. R. Rabiner, Multi-Rate Signal Processing, Prentice-Hall: Englewood Cliffs, N.J., 1983, pp. 88-91, (hereinafter, Reference 10);

http://en.wikipedia.org/wiki/Universal_Transverse_Mercator_coordinate_system, (hereinafter, Reference 11);

J. F. Canny, "A Computational Approach to Edge Detection," IEEE Trans. Pattern Matching and Machine Intelligence, 8(6): 678-698, 1986, (hereinafter, Reference 12);

H. Stark and P. Oskoui, "High Resolution Image Recovery from Image-Plane Arrays Using Convex Projections," J. Opt. Soc. Am. A, 6, 1715-1726, 1989, (hereinafter, Reference 13);

S. Lee, G. Wolberg, and S. Y. Shin, "Scattered Data Interpolation with Multilevel B-Splines," IEEE Trans. Visualization and Computer Graphics, 3(3): 1997, (hereinafter, Reference 14);

D. G. Lowe, "Distinctive Image Features from Scale-Invariant Keypoints," Int. J. Computer Vision, 60(2): 91-110, 2004, (hereinafter, Reference 15);

M. Kass, A. Witkin, and D. Terzopoulos. "Snakes: Active Contour Models," Proc. First Int. Conf. Computer Vision, 259-269, 1987, (hereinafter, Reference 16);

C. C. H. Lean, A. K. B. See, and S. A. Shanmugam, "An Enhanced Method for the Snake Algorithm," Proc. First Int. Conf. Innovative Computing, Information, and Control, 2006, (hereinafter, Reference 17);

S. Marshall, "Review of Shape Coding Techniques," Image and Vision Computing, 7(4): 281-294, November 1989, (hereinafter, Reference 18);

M. Peura and J. Iivarinen, "Efficiency of Simple Shape Descriptors," 3rd Int. Workshop on Visual Form, Capri, Italy, May 1997, (hereinafter, Reference 19);

N. Chernov, and C. Lesort, "Least Squares Fitting of Circles and Lines," J. Mathematical Imaging and Vision, 23: 239-251, 2005, (hereinafter, Reference 20);

K. Levenberg, "A Method for the Solution of Certain Problems in Least Squares," Quart. Applied Mathematics, 2: 164-168, 1944, (hereinafter, Reference 21);

D. Marquardt, "An Algorithm for Least Squares Estimation on Nonlinear Parameters," SIAM J. Applied Mathematics, 11: 431-441, 1963, (hereinafter, Reference 22);

H. W. Kuhn, "The Hungarian Method for the Assignment Problem," Naval Research Logistic Quarterly, 2: 83-97, 1955, (hereinafter, Reference 23);

Hi. W. Kuhn, "Variants of the Hungarian Method for Assignment Problems," Naval Research Logistic Quarterly, 3: 253-258, 1956, (hereinafter, Reference 24);

J. Munkres, "Algorithms for the Assignment and Transportation Problems," J. Soc. Industrial and Applied Mathematics, 5(1): 32-38, 1957, (hereinafter, Reference 25);

E. Burgeois and J. C. Lassalle, "An Extension of the Munkres Algorithm for the Assignment Problem to Rectangular Matrices," Comm. ACM, 14: 802-806, 1971, (hereinafter, Reference 26); and S. S. Blackman, Multiple-Target Tracking with Radar Applications, Artech House: Norwood, Mass., 1986, pp. 397-401, (hereinafter, Reference 27).

SUMMARY

Disclosed herein are methods and systems to detect changes within an area, including to identify objects in sonar images of the area, to compare the detected objects to a database of known objects in the area, and to identify any changes within the area. Newly detected objects may be presented to a human operator in real-time.

Also disclosed herein are methods and system to detect changes based on multi-frequency band sonar data.

Also disclosed herein are methods and system to represent multi-dimensional sonar data, such as multi-frequency band sonar data and corresponding position information, as support vector data description (SVDD) statistics, and to identify and characterize objects from the SVDD statistics, including to characterize an object with respect to one or more invariant features, which may be based on locations of points on a boundary of the object relative to other points on the boundary.

Also disclosed herein are methods and system to correlate multi-dimensional characteristics of newly detected objects or contacts, with multi-dimensional characteristics of known objects, and to optimally assign contacts to known objects.

Also disclosed herein are methods and system to manage a database of objects, including to add new objects for contacts that do not correlate to existing or known objects, and to manage a confidence metric associated with the objects.

BRIEF DESCRIPTION OF THE DRAWINGS/FIGURES

FIG. 7A is an image of a shipwreck.

FIG. 7B is a simulated scattered-data image of image of FIG. 7A.

FIG. 7C is a multi-level B-Spline algorithm (MBA) reconstructed image generated from the image of FIG. 7B.

FIGS. 8A through 8F are graphic depictions of an application of an expanded version of a snake algorithm for the shipwreck example of FIG. 7C.

Figure 1:
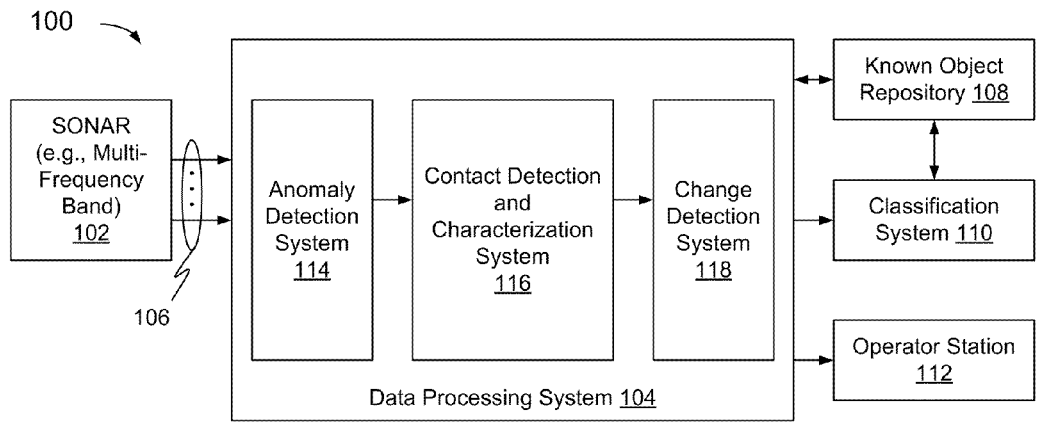
FIG. 1 is a block diagram of an exemplary environment, including a sonar system to survey an area, and a data processing system to receive sonar data from the sonar system and to detect changes between surveys.

In the drawings, the leftmost digit(s) of a reference number identifies the drawing in which the reference number first appears.

DETAILED DESCRIPTION

1. Introduction

Where targets of interest are unknown or undefined, direct object detection may be challenging or potentially precluded. Change detection may be performed relative to a known or determinable background.

FIG. 1 is a block diagram of an exemplary environment 100, including a sonar system 102 to survey an area, and a data processing system 104 to receive sonar data 106 from sonar system 102 and to detect changes between surveys. Changes may include placement, removal, and changes in location of physical objects.

Data processing system 104 may be configured to identify potential objects, referred to herein as contacts, within a survey area, and to compare the contacts to known objects within the area. Known object data may be stored in a repository 108, such as a database.

Data processing system 104 may include an anomaly detection system 114 to detect anomalies against a natural background such as a sea bed, a contact detection and characterization system 116 to identify and characterize contacts from the anomalies, and a change detection system 118 to correlate characterized contacts with objects in repository 108.

Contacts that do not correlate to known objects may represent potential new objects. Data processing system 104 may be configured to notify an operator station 112, in real time, of detected changes, such as potential new objects.

Data processing system 104 may be configured to process multiple-frequency band sonar data 106. For example, sonar system 102 may include a side-looking, multiple-frequency band sonar system, such as an EdgeTech 4200, dual-frequency band (300 and 600 kHz), side-scan sonar system (Reference 9).

Sonar system 102 and sonar data 106 are not, however, limited to single or dual-frequency bands. Sonar system 102 may be configured for, and sonar data 106 may include, N simultaneous frequency bands, where N may be equal to or greater than 1, including greater than 2.

The simultaneous multiple frequency bands may have different corresponding sampling rates, and anomaly detection system may be configured to time-align the multiple-frequency band sonar data 106. Time-alignment may include re-sample the multiple-frequency band sonar data 106 to at a common sample rate.

Environment 100 may include a classification system 110 to create new objects corresponding to contacts that do not correlate to existing or known contacts and to manage confidence metrics associated with the object. For example, classification system 110 may be configured to classify new objects as tentative objects, to re-classify tentative objects as confirmed objects after repeated identification of the corresponding contacts in subsequent surveys, and to remove or to reclassify objects to tentative objects when corresponding contacts do not appear in subsequent surveys. Object classification system 110 may be configured to operate subsequent to a survey, which may preserve processor resources during the survey.

Figure 2:
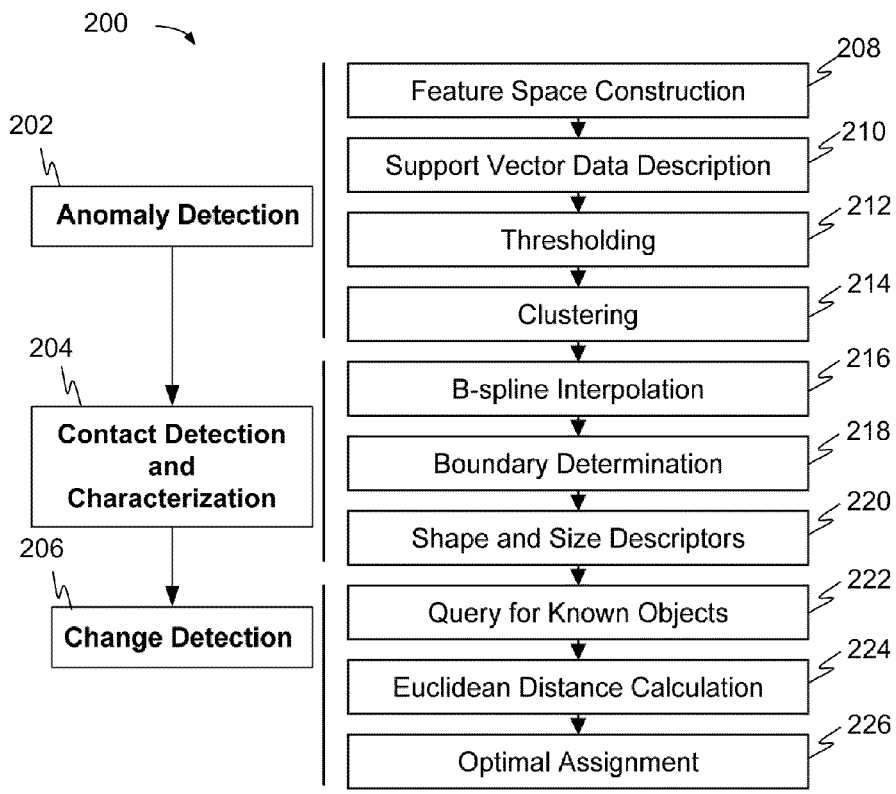
FIG. 2 is a process flowchart of an exemplary method of detecting changes between sonar surveys.

FIG. 2 is a process flowchart of an exemplary method 200, which may be performed in real-time during a survey. Data processing system 104 in FIG. 1 may be configured to implement method 200, or portions thereof.

Figure 3:
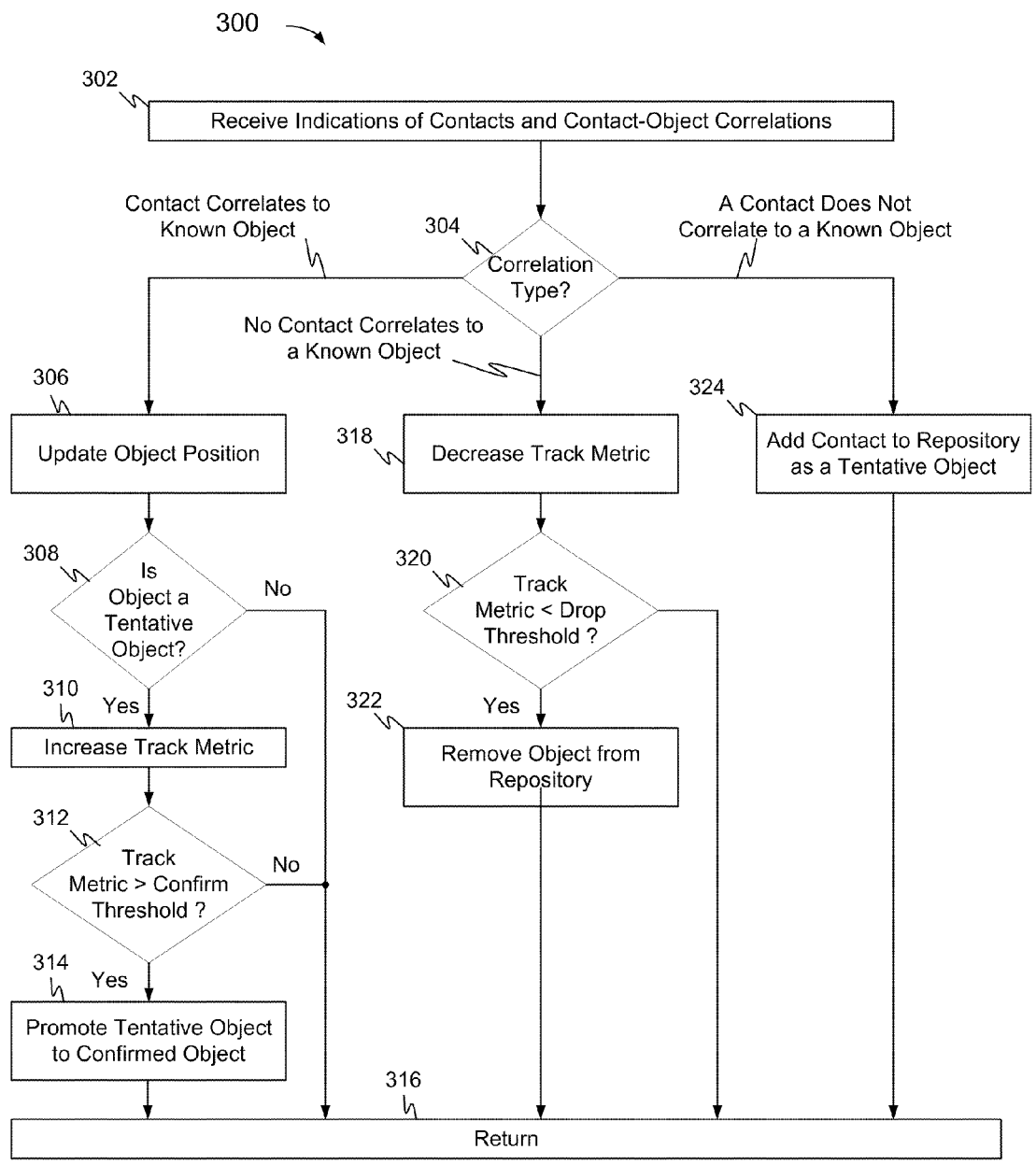
FIG. 3 is a process flowchart of an exemplary method of managing new and known objects.

FIG. 3 is a process flowchart of an exemplary method 300, which may be performed off-line or post-survey. Classification system 110 in FIG. 1 may be configured to implement method 300, or portions thereof.

In FIG. 2, method 200 includes anomaly detection at 202, object detection at 204, and change detection at 206.

2. Anomaly Detection

Anomaly detection at 102 may include detecting data that do not appear to be background. This may include distinguishing object pixels from background pixels. Such anomalous pixels may be part of an object or spurious background returns. Anomalous data may be analyzed and processed as described below.

Anomaly detection is a useful technique to classify data when characteristics of the background are known or determinable. Of the potential billions of pixels that represent a surveyed channel, a relative large majority may correspond to bottom sediment background. Because varying environmental effects along a water channel may produce relatively significant background variation, it may not be practical to model the background statistically.

Anomaly detection at 102 may be performed with a relatively large-margin classification technique to classify data without statistical estimation, such as a support vector data description (SVDD) technique. SVDD is addressed in References 7 and 8, which are incorporated herein by reference in their entireties. Exemplary SVDD techniques with respect to anomaly detection are described below with respect to 210 of FIG. 2.

(a) Feature Space Construction

Anomaly detection at 202 may include feature space construction at 208.

Feature space construction may be performed with respect to multi-frequency band sonar data 106 in FIG. 1.

Where sonar data 106 includes multi-frequency band data, the sonar data may provide additional data to detect objects relative to single-band data. For example, returns from objects may appear in multiple bands, while returns from sediment scattering may appear in fewer than all bands.

The EdgeTech 4200, for example, collects data from both frequency bands simultaneously, but provides the data for each band at a different sample rates. For example, during sea tests described below, the EdgeTech 4200 was operated at a nominal 10-Hz ping rate, providing a 75-m range, for an assumed speed of sound of 1500 m/s. The higher frequency band nominally provides a 1-cm range resolution, while the lower frequency band provides a 3-cm range resolution.

As noted above, sonar data 106 is not limited to single or dual-frequency bands and may include N frequency bands, where N may be equal to or greater than 1, including greater than 2.

To align the data samples, both bands may be re-sampled. The number of samples collected during a survey and the ping interval may be utilized in the re-sampling. With sonar 102 set to provide a certain maximum range, an optimum or desired number of samples collected at the highest resolution (1 cm) may be determined. Then, given the number of desired samples and the number of actual samples, a re-sampling factor may be determined. Signal re-sampling may be performed with a polyphase structure. Signal re-sampling with a polyphase structure is addressed in Reference 10, which is incorporated herein by reference in its entirety.

Figure 4:
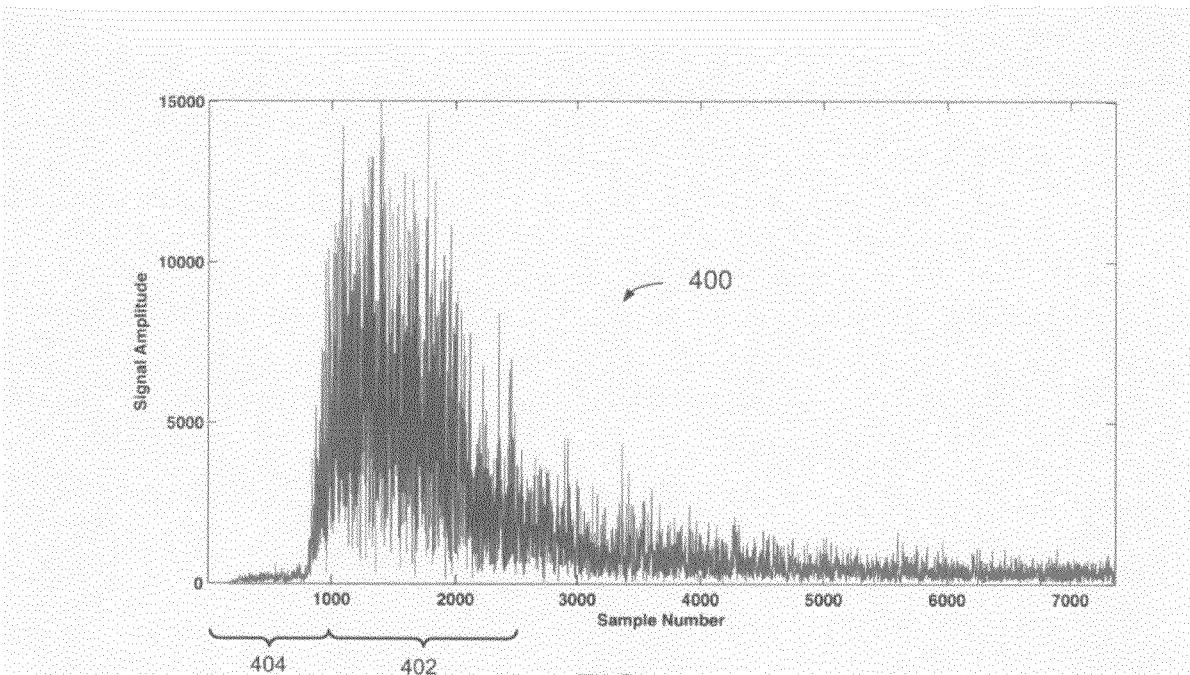
FIG. 4 is a graphic depiction of an exemplary scan line corresponding to one side of a side-scan sonar survey.

Re-sampled signal amplitudes for the high-frequency and low-frequency bands may represent two dimensions of data for object detection. The data may exhibit spatial trends which may be taken into account. For example, due to factors that may include, without limitation, attenuation loss, spreading loss, beam shape, ambient noise, and volume reverberation, each scan line (amplitude versus time return for a single ping) may exhibit a logarithmic shape. FIG. 4 is a graphic depiction of an exemplary scan line 400 corresponding to one side of a side-scan sonar survey. Relatively large sand waves, which may measure several meters in length, may also affect cross-range dimension. Data may be normalized to remove such uninformative trends.

Physical coordinates, such as in castings and northings, of each sonar data sample may be calculated and used as additional feature dimensions, referred to herein as third and fourth feature dimensions, respectively. The physical coordinates may be calculated using a Universal Transverse Mercator (UTM) projection. UTM is addressed in Reference 11, which is incorporated herein by reference in its entirety.

Figure 5:
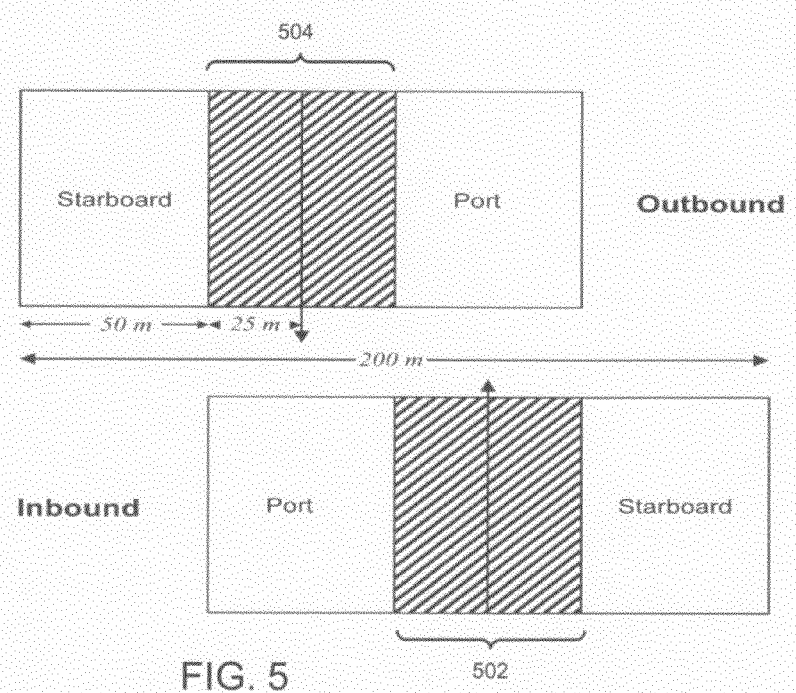
FIG. 5 is a graphic depiction of exemplary inbound and outbound sensor paths.

In FIG. 4, signals in the first 2500 samples correspond to 25 meters with a 1-cm range resolution. A first portion 402 is relatively noisy, and a second portion 404, corresponding to approximately the first 1000 samples, corresponds to the holiday region beneath the sonar sensor. Data associated with portion 402 and 404 may be ignored, and survey paths may be aligned and/or overlapped to obtain data for the corresponding areas. FIG. 5 is a graphic depiction of exemplary inbound and outbound sensor paths 502 and 504, respectively.

(b) Support Vector Data Description

Returning to FIG. 2, anomaly detection at 202 may include generating a support vector data description (SVDD) of the feature space construction at 210.

Inputs to an SVDD classifier may include a multi-dimensional feature space, such as described above with respect to 208, which may include re-sampled signal amplitudes of high-frequency and low-frequency bands and corresponding physical coordinates. Samples from the feature space may be assumed to represent background data, and the SVDD may be trained to recognize these samples.

Training samples that are identified as anomalies may be removed, and the SVDD may be re-trained on the remaining training samples. Such an iterative training process may reduce or eliminate non-background samples from the training, which may result in a more accurate SVDD decision surface.

Mathematically, the SVDD may describe or define training samples of a training set T, in a relatively high dimensional space through a kernel function transformation, and may then determine parameters of a smallest hypersphere S that can encompass the training set T, which may be subject to one or more constraints. S and T may be define as:

$$S = \{\Phi(x_i) : \|\Phi(x) - a\|^2 < R^2\}$$

$$T = \{\Phi((x_i), i=1 \ldots M\}$$

The hypersphere may be manifest as a relatively complex, possibly disjoint, decision boundary in the original four-dimensional feature space. Finding the smallest hypersphere S that contains the training set T may be a constrained optimization problem which may be represented as:

$$\min(R) \text{ subject to } \Phi(x_i) \in S, i=1, \ldots, M \qquad (1)$$

In equation 1, $\Phi(x_i)$ is a higher dimension feature space mapping. Calculation of the hypersphere may be solved through calculus of variations. Calculus of variations is addressed in References 7 and 8, which are incorporated herein by reference in their entireties.

Solving for minimization may including maximizing the Lagrangian:

$$L = \sum_i \alpha_i \langle \Phi(x_i), \Phi(x_i) \rangle - \sum_{i,j} \alpha_i \alpha_j \langle \Phi(x_i), \Phi(x_j) \rangle \qquad (2)$$

through the selection of $\alpha_i$ with $\alpha_i \geq 0$ and $\Sigma_i \alpha_i = 1$. Typically, a large number of the Lagrangian multipliers, $\alpha_i$, will be zero. The rest correspond to the support vectors of the training set T. The higher dimension feature space mapping, $\Phi(x_i)$, is taken as the Gaussian Radial Basis Function (RBF):

$$K(x, y) = \langle \Phi(x), \Phi(y) \rangle = \exp\left(-\frac{\|x-y\|^2}{\sigma^2}\right) \qquad (3)$$

Feature vectors that lie outside the hypersphere may be identified as anomalies. Substituting expressions and simplifying gives the final SVDD decision statistic for an unknown feature vector, z, as:

$$SVDD(z) = 1 - 2\sum_i \alpha_i K(z, x_i) + \sum_{i,j} \alpha_i \alpha_j K(x_i, x_j) \geq R^2 \qquad (4)$$

Conventional statistical detection approaches involve modeling data and estimating parameters of the model. Challenges with such approaches include determining a data model. For example, where the sonar data is treated as a random process, the underlying distribution of the process may not be readily discernable or definable. Another challenge with conventional statistical detection approaches is determining distribution parameters. Distribution parameters may be approximated from measured data that are binned to form estimated probability density functions. For data of more than one dimension, binning may pose challenges. For example, as the number of dimensions increases, the likelihood of measuring samples to populate each bin may be reduced. Where the probability density functions are not accurately estimated, unpredictable detection performance may be encountered. Where the sonar data random process is not stationary, multiple models may be required, which may further complicate the challenges above.

An SVDD approach as disclosed herein may negate such challenges by examining the data directly. An optimal decision boundary may be determined by points on or near an SVDD surface, referred to herein as support vectors. With relatively little tuning, an SVDD may define a relatively complex surface that envelops the background data, leaving anomalies outside.

FIGS. 6A through 6F graphically depict an exemplary three-dimensional nonlinear decision boundary for multimodal data.

Figure 6A:
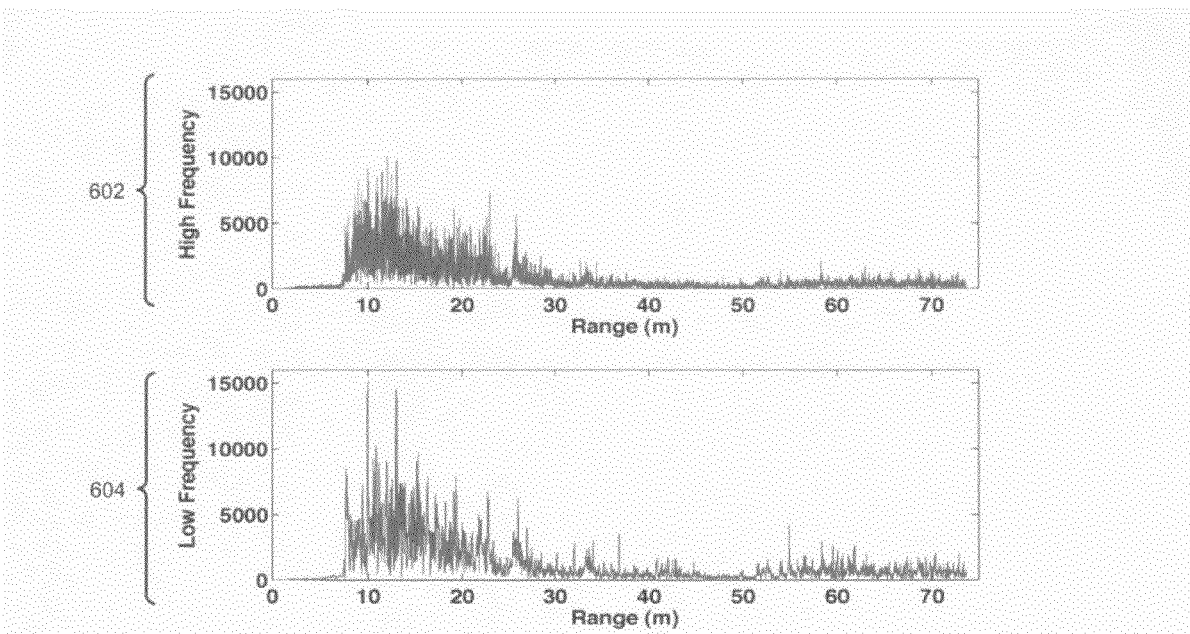
FIG. 6A is a graphic depiction of exemplary high-frequency data and low-frequency data, versus range.

FIG. 6A is a graphic depiction of exemplary high-frequency data 602 and low-frequency data 604, versus range.

Figure 6B:
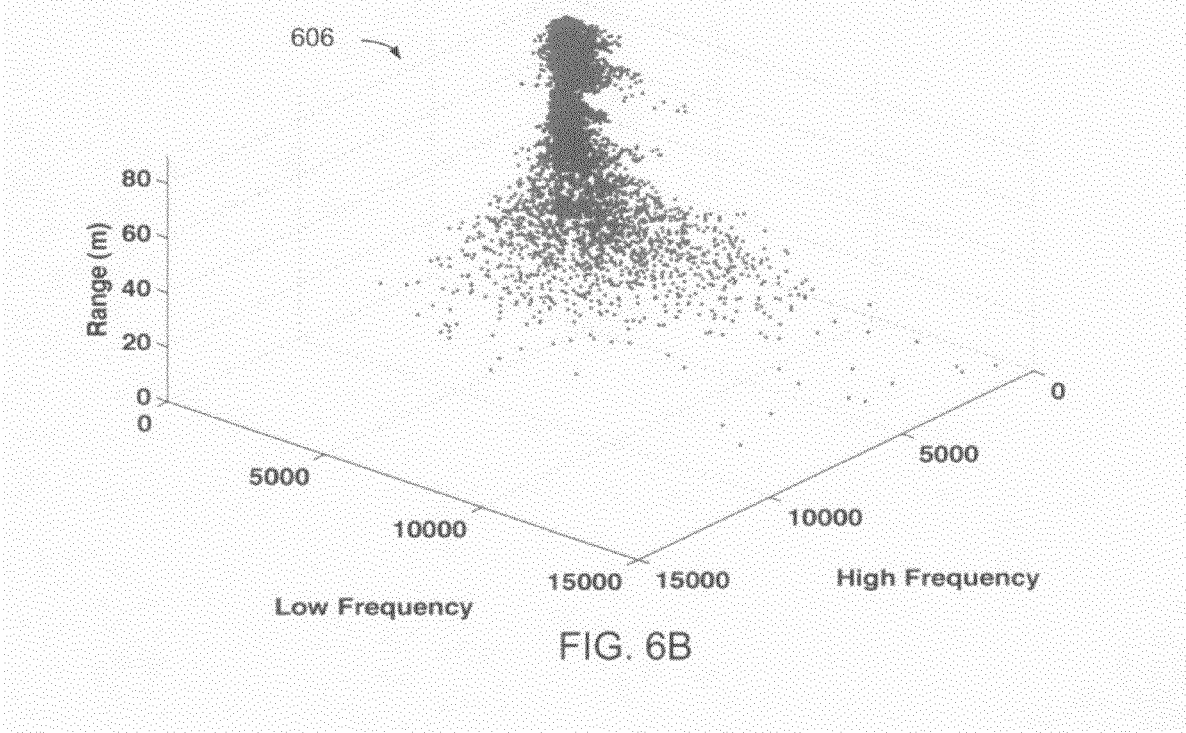
FIG. 6B is a graphic depiction of exemplary three-dimensional data corresponding to the high-frequency and low-frequency data of FIG. 6A.

FIG. 6B is a graphic depiction of exemplary three-dimensional data 606 corresponding to the high-frequency 602 and low-frequency data 604 of FIG. 6A.

Figure 6C:
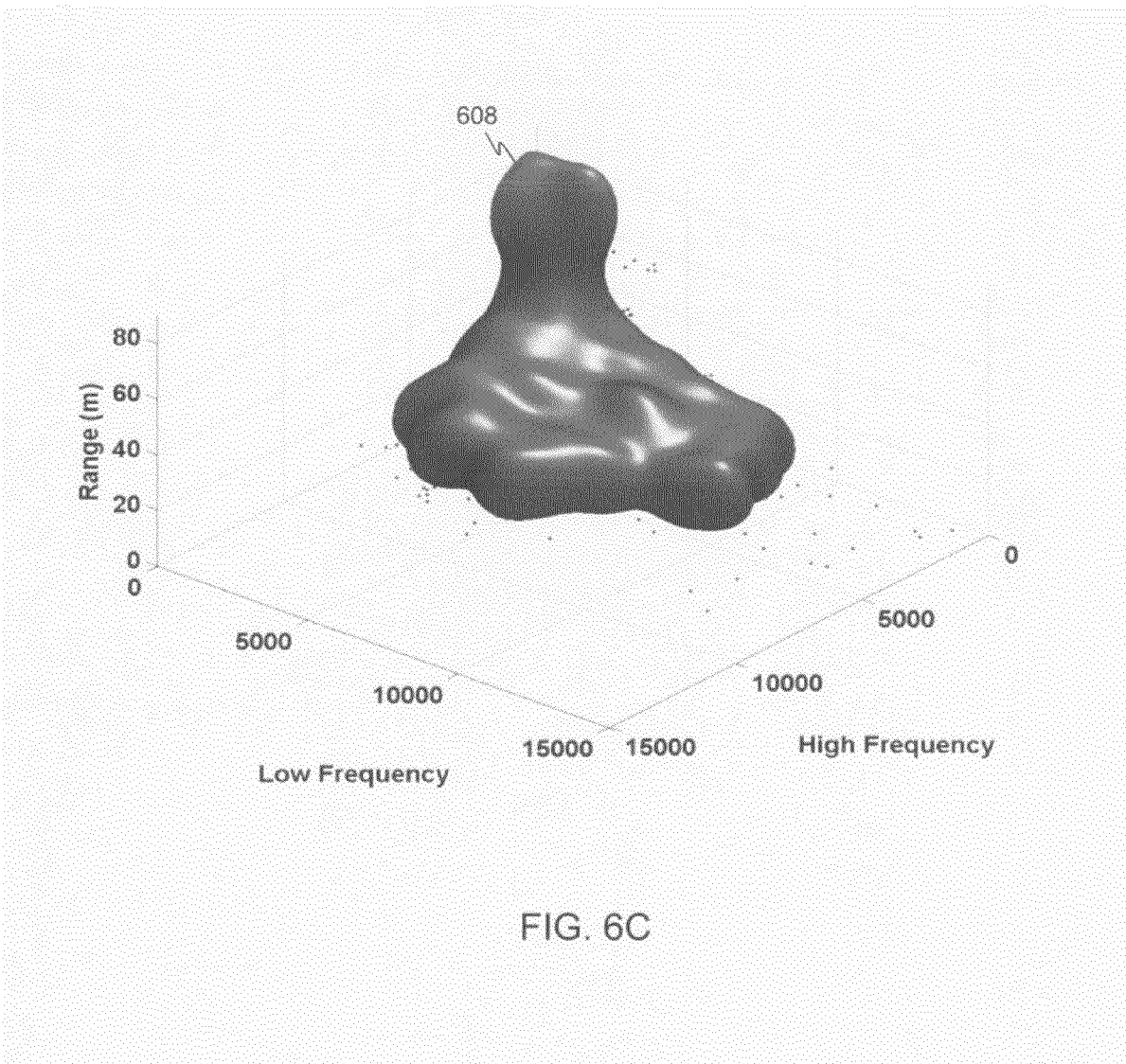
FIG. 6C is a graphic depiction of an exemplary SVDD decision surface and outliers or anomalies, corresponding to the three-dimensional data of FIG. 6B.

FIG. 6C is a graphic depiction of an exemplary SVDD decision surface 608 of an SVDD hypersphere (having an exemplary inverted mushroom shape), with outliers or anomalies, corresponding to the three-dimensional data of FIG. 6B, which are overlayed by the SVDD decision surface. The scattered points depicted outside of the SVDD decision surface 608 are the outliers or anomalies.

Figure 6D:
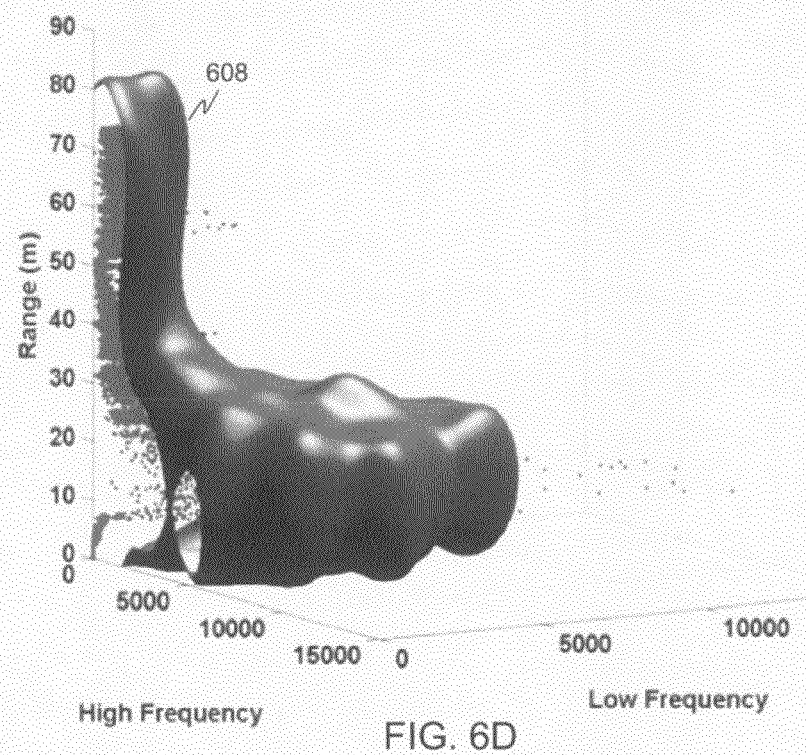
FIG. 6D is a graphic depiction of a side view, relative to FIG. 6C, of the SVDD decision surface and anomalies.

FIG. 6D is a graphic depiction of a side view, relative to FIG. 6C, of SVDD decision surface 608 and outliers or anomalies.

Figure 6E:
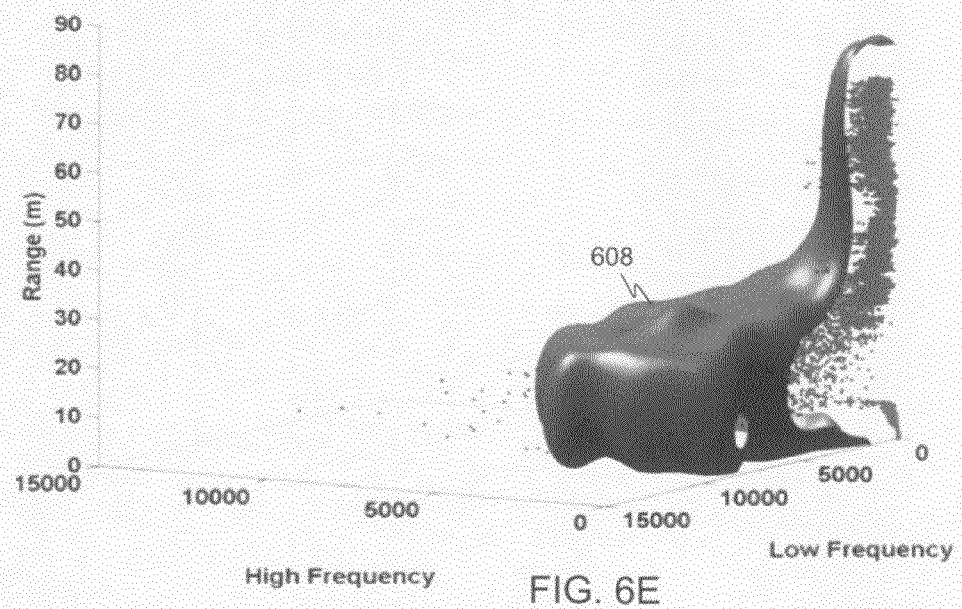
FIG. 6E is a graphic depiction of another side view, relative to FIG. 6C, of the SVDD decision surface and anomalies.

FIG. 6E is a graphic depiction of another side view, relative to FIG. 6C, of SVDD decision surface 608 and outliers or anomalies.

Figure 6F:
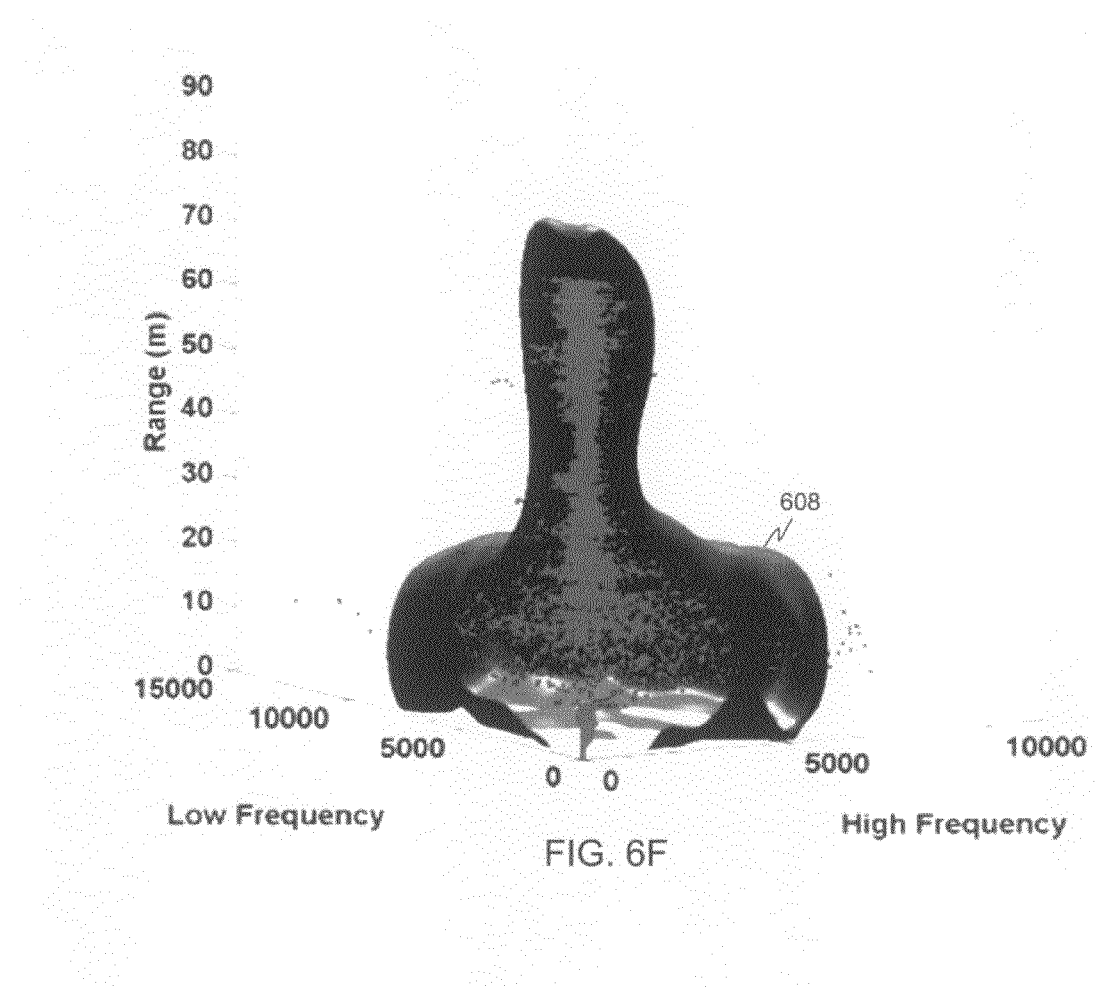
FIG. 6F is a graphic representation of a rear-view, relative to FIG. 6C, of the SVDD decision surface and anomalies.

FIG. 6F is a graphic representation of a rear-view, relative to FIG. 6C, of SVDD decision surface 608 and outliers or anomalies.

In the examples of FIGS. 6A through 6F, three-dimensional data are shown for illustrative purposes. Method 200 may be implemented with data of greater and lesser dimensions.

An advantage of SVDD, as disclosed herein, is that once trained, high variability in the background data may have substantially little or no impact on the ability of the SVDD to detect anomalies. Training involves sampling the background at numerous representative locations. SVDD is also able to handle multiple frequency bands.

Another advantage of SVDD is that, because additional dimensions do not lead to sparse training sets, SVDD may be applied to other types of sensors with multiple frequencies and/or aspects or beams.

(c) Thresholding and Clustering

Anomaly detection at 202 may include thresholding at 212 and clustering at 214.

The placement of a SVDD decision boundary 608, such as illustrated at FIGS. 6C through 6F, represents a threshold operation to which points 606 are subjected. Points 606 within decision boundary 608 are background. Points outside decision boundary 608 are anomalies. Decision boundary 608 may represent an optimal boundary in a mathematical sense. Costs associated with misclassification are not, however, necessarily equal between background and anomaly. To reduce false alerts, a minimum distance or threshold beyond decision boundary 608 may be defined, beyond which a data point must lie to be an anomaly. This may be equivalent to increasing the radius of the SVDD hypersphere or decision boundary 608.

Thresholding at 112 may include a hysteresis threshold. First, the SVDD decision statistic may modified by:

$$z' = \frac{z}{R} - 1 \quad (5)$$

where z is the original SVDD decision statistic and R is the SVDD hypersphere radius. The hypersphere radius may be determined by computing the SVDD statistics for a support vector that lies exactly on the hypersphere. By definition, the smallest statistic value of any support vector is the radius. Equation 5 normalizes the data so that points on the hypersphere have a value of zero and all points are expressed in relation to the hypersphere size. This may be useful where the SVDD classifier is constantly retraining during real-time operations, and the hypersphere size may vary from one training cycle to the next.

Then, all points with a value less than a threshold, $\lambda_1$, are set to zero and the remaining points are clustered at 214. If a cluster does not contain a data sample above a second, higher threshold, $\lambda_2$, the points for that cluster are set to zero, and the cluster is discarded. This two-stage thresholding technique allows for detection of less obvious anomalies while preserving good false alert performance. There are many approaches to thresholding data, but this approach has proven effective. Hysteresis thresholding is addressed in Reference 12, which is incorporated herein by reference in its entirety.

Clustering at 214 may combine the individual threshold crossings, which may correspond to a binary data surface, in the SVDD decision space to enable detections of whole objects. An object may be represented in the sonar data by many individual samples in relatively close spatial proximity to one another. Clustering at 214 may identify groups of samples in relatively close spatial proximity.

Clustering may include selecting a nonzero pixel and then examining neighbor pixels. A neighbor is a pixel that is simply in the row or column next to a point under consideration. Nonzero neighbor pixels may be added to the cluster. The process may repeat recursively for each nonzero neighbor until a pixel is found that has no nonzero neighbors that are not already members of the cluster. This approach works when pixels are located at fixed integer locations, as represented by a matrix.

Where pixels correspond to arbitrary locations, clustering at 214 may include clustering pixels when they are within a distance r of one another. When this approach is applied to each nonzero pixel, clustering of scattered sonar pixel data may be performed in $N^2$ operations, where N is the number of nonzero pixels. The processing may be reduced to approximately NlogN operations. Clustering at 214 may result in a list of clusters that are themselves lists of individual pixels.

Object detection at 204, described below, may include omitting or discarding clusters based on size, such as clusters of pixels having a length and/or width dimension below or outside of a threshold. This prescreening may reduce or eliminate clusters that result from spurious SVDD responses, and may reduce corresponding false alerts.

3. Contact Detection and Characterization

At 204, potential objects, or contacts may be detected and characterized. Contacts may be detected or defined as clusters of anomalous sonar data, as described above with respect to 214.

Contact characterizations may be subsequently compared to characterizations of known objects at similar locations, such as described below with respect to 206. At least a portion of the characterizations may be based, at least in part, on perimeter or boundary information associated with contacts and objects. Accordingly, characterization at 204 may include determining perimeter or boundary information, such as described below with respect to 218, and characterizing contacts with respect to shape and size, such as described below with respect to 220.

Contact detection at 204 may include separating sonar data corresponding to the contacts from the seafloor background. The anomalousness of the sonar data, as determined by the SVDD, is a useful measure to determine set membership, in part because SVDD reduces multiple data layers, such as individual frequency bands, aspects, and beams, into a single layer.

SVDD data may, however, be limited to representation of relatively sparse, non-uniform measurements of the sonar. Characterization at 204 may thus include converting the relatively sparse, non-uniform measurements to a relatively regularly sampled representation of the contact perimeters. One or more of a variety of scattered data interpolation techniques, such as projection onto convex sets (POCS), may be implemented to convert the relatively sparse, non-uniform measurements to a relatively regularly sampled representation of the contact perimeters. POCS is addressed in Reference 13, which is incorporated herein by reference in its entirety.

Alternatively, or additionally, a spline function, such as a basis or B-spline function may be implemented.

(a) B-Spline Interpolation

In FIG. 2, contact detection and characterization at 204 may include B-spline interpolating at 216. B-spline interpolating at 216 may include a multilevel B-spline algorithm (MBA). MBA is addressed in Reference 14, which is incorporated herein by reference in its entirety.

An MBA iteratively fits a B-spline surface to the scattered data to form a control lattice, which can be used to estimate a surface through the scattered data at regularly spaced points. B-spline interpolation may be computationally less expensive and less complex to implement relative to other techniques.

FIGS. 7A through 7C graphically illustrate an example MBA applied to an image of a shipwreck.

FIG. 7A is an image 702 of a shipwreck, generated from an EdgeTech 4200 series side-scan sonar. Image 702 was obtained from an EdgeTech Corporation website.

FIG. 7B is a simulated scattered-data image 704 of image 702, generated by removing approximately 90% of the original data from image 702 at random.

FIG. 7C is an MBA reconstructed image 706, generated after 8 MBA iterations. Although image 706 may lack some detail of image 702, considering the under-sampled input of image 704, image 706 is a reasonable representation or reconstruction of image 702.

(b) Boundary Determination

Contact detection and characterization at 204 may include boundary determination at 218.

Side-scan sonar data of an object may differ each time the object is sensed by the sensor. This may be due to one or more of the relatively high aspect dependency of the individual reflecting surfaces of the object, variability of the medium, and variation of position and orientation of the sensor relative to the object. The inconsistent sonar returns may raise challenges in change detection because visual appearance, or amplitude, alone may be insufficient to accurately detect changes.

Much work has been done in the image-processing field to overcome affine transformations due to rotation and aspect changes, as well as additive or multiplicative noise, but the assumption of a consistent object appearance is fundamental to these methods. For example, the method outlined in Reference 15 is widely considered state of the art in interest point detection and association. But it implicitly assumes that an object looks like the entity it is no matter how it is viewed.

Size and shape of contacts may be inferred from side-scan sonar measurements with relatively minimal error. Boundary determination at 218 may exploit these properties for object matching. As described below with respect to 220 in FIG. 2, a contact may be characterized with respect to size and shape based on locations of points on a surface relative to other points on the surface. Therefore, affine transformations due to changes in perspective do not affect the calculations. Similarly, rotation, translation, and scale are not factors, provided the surface of the object is described within a fixed reference frame. Because only the boundary of the object is used for description, the actual appearance of the object and any noise or distortion within it may be relatively inconsequential. Additionally, while severe noise, blurring, and similar distortions may alter the apparent boundary of an object, the features to be developed may be aggregates of the overall boundary. Localized changes to the boundary may impact the feature calculation only modestly.

Boundary determination at 218 may include one or more of a variety of techniques. For example, in optical image processing, an active contour model, also known as a snake algorithm, defines an energy functional $v(s)=(x(s), y(s))$ with arc length s as a parameter in the equation:

$$E_{TOT} = \int_0^1 E_{int}(v(s)) + E_{im}(v(s)) + E_{con}(v(s))ds \quad (6)$$

$E_{int}$ represents the internal energy of the contour due to bending and discontinuities. $E_{im}$ represents the image forces, typically due to gradients. $E_{con}$ represents the constraints applied to the contour. The snake algorithm iteratively changes the points along the contour to minimize the total energy in Equation (2). Snake algorithms are addressed in Reference 16, and an expanded version of the snake algorithm is addressed in Reference 17, both of which are incorporated herein by reference in their entireties.

FIGS. 8A through 8F are graphic depictions of an application of the expanded version of the snake algorithm for the shipwreck example of FIG. 7C.

In FIG. 8A, an initial contour 802 is illustrated as an ellipse that encompasses the contact or shipwreck. As the algorithm progresses through FIGS. 8B through 8F, coordinates of contour 802 are repositioned as contours 804 through 812, respectively, to minimize energy, subject to constraints, and to shrink the contours. In FIG. 8F, contour 812 substantially reflects the two-dimensional shape or perimeter of the shipwreck. In this example, contour 812 was achieved in 100 iterations, and contours 804 through 810 correspond to iterations 20, 40, 60, and 80, respectively.

Another approach includes convolution, which may include convolving a B-spline reconstructed image with a convolution kernel, such as a circularly shaped convolution kernel.

A contour of a contact may be defined as a path that the center of the convolution kernel would trace when rolled around the contact. The size of the circle determines the extent to which concavities of the contact are recognized. Smaller circles fit into smaller regions. Larger circles skip over larger regions.

The contour at a particular threshold level may serve as a boundary of the object. The threshold level may be set to the highest level for which a single continuous boundary is formed. Higher threshold levels may result in disjoint boundaries. Lower threshold levels may result in inaccurate boundaries. The convolution operation is relatively tolerant of noisy peaks, while providing a close fit to the actual contact or potential object.

Figure 9:
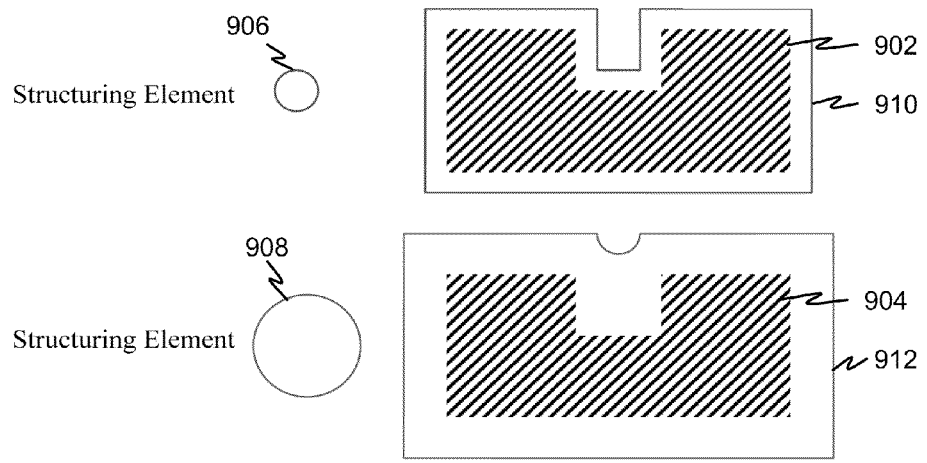
FIG. 9 is a graphic depiction of exemplary convolution operations with respect to an image perimeter.

FIG. 9 is a graphic depiction of exemplary convolution operations with respect to an image perimeter. FIG. 9 includes two instances of an image, 902 and 904, two corresponding structuring elements or kernels 906 and 908, and corresponding boundaries 910 and 912 that result from convolving structuring elements 906 and 908 with perimeters of respective images 902 and 904.

Figure 17:
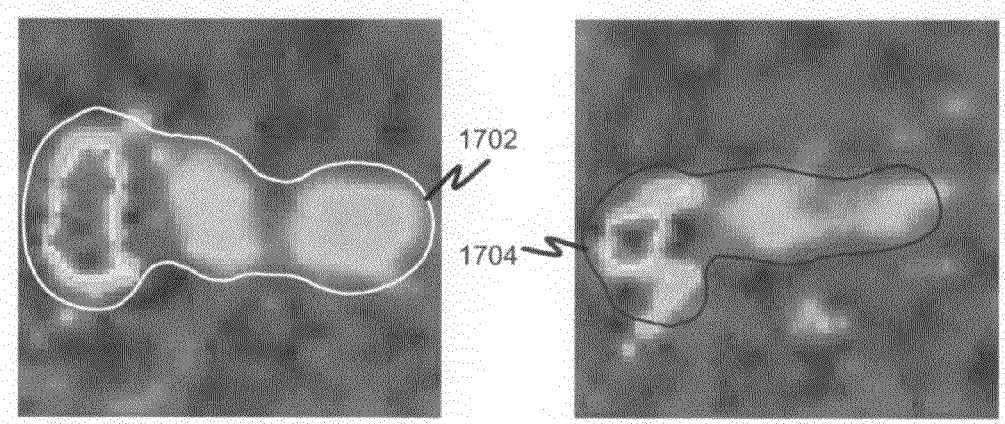
FIG. 17 is a graphic depiction of a convolution operation performed with actual sonar data, described below with respect to experimental results.

FIG. 17 is graphic depiction of a convolution operation performed with actual sonar data, described below with respect to experimental results.

(c) Shape and Size Descriptors

Contact detection and characterization at 204 may include characterizing contacts with respect to one or more of size and shape at 220.

Applications of six exemplary descriptors, determined from the size and shape of an object, are described below. Alternatively, or additionally, other descriptions may be used. Descriptors are addressed in Reference 18, which is incorporated herein by reference in its entirety.

Exemplary size descriptors include length and width of a contact. Size descriptors may also include height, where height information is available.

To calculate descriptors, contact boundary points may be projected onto two orthogonal axes in a fixed orientation, and the extent of the points along each axis may be calculated. The fixed axes may correspond to a Universal Transverse Mercator (UTM) coordinate grid. Where the perimeter of the contact is defined by a set of points (x, y) in the fixed reference frame, the length descriptor, L, may be determined as:

$$L = MAX(y) - MIN(y) \quad (7)$$

and the width descriptor, W, may be determined as:

$$W = MAX(x) - MIN(x) \quad (8)$$

One or more shape descriptors may be defined to characterize an overall pattern formed by the perimeter set (x, y).

Exemplary shape descriptors include convexity, principal components, compactness, and circularity. Shape descriptors are addressed in Reference 19, which is incorporated herein by reference in its entirety.

Convexity may be defined as a ratio of the curve length of the convex hull of (x, y) to the curve length of the full perimeter (x, y). The convex hull of a set of points may be defined as the minimal convex set containing all the points. An area may be defined as convex if, for all pairs of points within the area, a straight-line segment between the points falls entirely within the area. A similar definition may be applied to areas in two-dimensional space.

Figure 10:
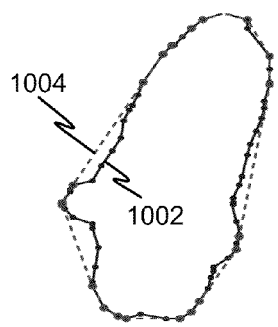
FIG. 10 is a graphic depiction of a perimeter of an area, similar to a contour in FIG. 5F, and a corresponding convex hull.

FIG. 10 is a graphic depiction of a perimeter 1002 of an area, similar to contour 812 in FIG. 8F, and a corresponding convex hull 1004. The perimeter of an area described by the N-point set (x, y) may be defines as:

$$S = \sqrt{(x_N - x_1)^2 + (y_N - y_1)^2} + \sum_{i=2}^{N} \sqrt{(x_i - x_{i-1})^2 + (y_i - y_{i-1})^2} \quad (9)$$

If (x', y') is the M-point subset of perimeter points that define the convex hull, the perimeter of the convex hull may be defined as:

$$S_{hull} = \sqrt{(x'_M - x'_1)^2 + (y'_M - y'_1)^2} + \sum_{i=2}^{M} \sqrt{(x'_i - x'_{i-1})^2 + (y'_i - y'_{i-1})^2} \quad (10)$$

The invariant descriptor convexity, K, is given by:

$$K = \frac{S_{hull}}{S} \quad (11)$$

The range of values is theoretically [0,1], but values for actual shapes likely to be encountered may be towards the upper end of the range.

Convexity may be used to represent an intricacy of a contact boundary. Contacts with many concavities may have lower values of convexity. Barrels, spheres, tires, and similar objects may have K=1. Entities that are collections of objects, such as debris fields, or that have irregular shapes may have smaller values. In the example of FIG. 10, perimeter 1002 may have a convexity value of 0.97, indicating that it is mostly convex.

Figure 11:
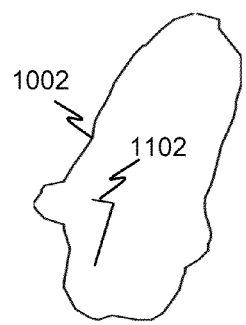
FIG. 11 is a graphic depiction of an exemplary orientation and relative proportions of principal axes for a perimeter illustrated in FIG. 10.

Principal components may be defined as a ratio of principal axes of a contact. If the perimeter of a contact (x, y) is taken as a population of two-dimensional data, the principal axes may be defined as orthogonal directions along which the data are uncorrelated. Rotating the perimeter into this reference frame allows analysis of the dominant modes of the shape. The ratio of the axes describes a dominance of a primary mode. FIG. 11 is a graphic depiction of an exemplary orientation and relative proportions of principal axes 1102 for perimeter 1002 of FIG. 10. In the example of FIG. 11, the ratio is approximately 0.26:1.

If x and y are column vectors containing the coordinates of the perimeter of an object in the fixed reference frame, a 2×2 covariance matrix, A, calculated between these vectors can be defined as:

$$A = \begin{bmatrix} a_{11} & a_{12} \\ a_{21} & a_{22} \end{bmatrix} \quad (12)$$

The eigenvectors of A are given by:

$$\lambda = \frac{1}{2}\left[(a_{11} + a_{22}) \pm \sqrt{(a_{11} + a_{22})^2 - 4(a_{11}a_{22} - a_{12}a_{21})}\right] \quad (13)$$

If:

$$u = \begin{cases} +1, & (a_{11} + a_{22}) > 0 \\ -1, & (a_{11} + a_{22}) \le 0 \end{cases} \quad (14)$$

the principal components descriptor, P, may be defined as:

$$P = \frac{\lambda_{min}}{\lambda_{max}} \quad (15)$$

$$= \frac{(a_{11} + a_{22}) - u\sqrt{(a_{11} + a_{22})^2 - 4(a_{11}a_{22} - a_{12}a_{21})}}{(a_{11} + a_{22}) + u\sqrt{(a_{11} + a_{22})^2 - 4(a_{11}a_{22} - a_{12}a_{21})}}$$

This descriptor has a theoretical range of [0, 1].

The compactness descriptor compares the squared perimeter of the object with its area. The descriptor is referenced to a circle equal in area to the object to normalize the descriptor to the range [0, 1], solely because a circle has the minimum ratio of $4\pi$. This normalization differs from a circularity descriptor described below. If the perimeter length of the object is given by S, and the area of the object is A, the compactness descriptor, C, is:

$$C = \frac{4\pi A}{S^2} \quad (16)$$

Elongated objects will have values near 0. Round objects will have values near 1. The object in FIG. 10 has a value of 0.62. The area of an object, given N perimeter points (x, y), is given by:

$$A = \frac{1}{2}\left|(x_1 - x_N)(y_1 + y_N) + \sum_{i=2}^{N}(x_i - x_{i-1})(y_i + y_{i-1})\right| \quad (17)$$

A circularity descriptor or circular variance may be determined by fitting the object perimeter to a circle in a least-squares sense. The circular variance may be defined as an overall error of the fit.

Fitting data to a circular region is common in physics, biology, medicine, archeology, industry, and other disciplines. Data fitting to a circular region is addressed in Reference 20, which is incorporated herein by reference in its entirety. A circular region is a natural shape for side-scan sonar object analysis, too, because many objects appear circular. However, with side-scan sonar, whether the perimeter of an object fits well to a circle is neither good nor bad. It is simply information.

Figure 12:
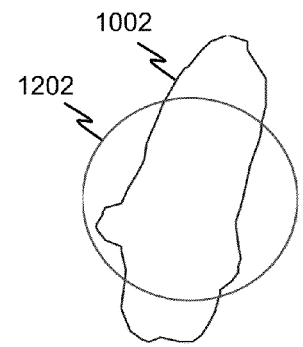
FIG. 12 is a graphic depiction of a circle that corresponds to a least-squares circle fit, or best circle fit to the perimeter of FIG. 10

FIG. 12 is a graphic depiction of a circle 1202 that corresponds to a least-squares circle fit, or best circle fit to perimeter 1002 of FIG. 10.

If the equation of the circle to which the perimeter is fit is:

$$(x-a)^2 = (y-b)^2 \quad (18)$$

the parameters a, b, and R may be determined through a nonlinear solution technique, such as a Levenberg-Marquardt method. Levenberg-Marquardt method is addressed in References 21 and 22, which are incorporated herein by reference in their entireties.

The root-mean-square (RMS) error for the perimeter is then:

$$\xi = \sqrt{\frac{1}{N}\sum_{i=1}^{N}\left(\sqrt{(x_i - a)^2 + (y_i - b)^2} - R\right)^2} \quad (19)$$

which has a minimum value of 0 for a perfect circle and increases for other shapes.

Circular variance may be determined as:

$$V = \frac{2}{2 - \frac{1}{\xi + 1}} - 1 \quad (20)$$

which has the effect of limiting it to the range [0, 1]. This descriptor has a value of 1 for a perfect circle and a smaller value for other shapes. The descriptor for FIG. 12 is 0.0038.

The exemplary descriptors described above may be used to characterize contacts or objects from side-scan sonar data where the size, location, orientation, and appearance of the objects may vary between data from different surveys. The descriptors are relatively invariant to these effects because they characterize the locations of points on the object surface relative to other points on the surface. Localized changes to the surface due to detection errors may only modestly impact the descriptor calculation.

4. Change Detection

Once calculation of the descriptors is complete, and objects in a particular geographical area have been detected and characterized at two different times, the automated detection problem is reduced to change detection. The goal now is to recognize new objects in the most recent observation.

(a) Query for Known Objects

Change detection at 206 may include querying for known objects at 222.

Objects previously detected in an area may be cataloged in a database that includes the current and historical geographical locations and descriptors. To account for movement of objects due to natural forces, historical position information may be retained, and objects may be tracked over time. Current object locations can then be predicted for better correlation. When changes are to be detected for a specified area, the database is queried for all known objects within the area. The query parameters may include geographical coordinates. The resulting list may be used to perform a many-to-many correlation, such as described below with respect to 226.

(b) Euclidean Distance Calculation

Change detection at 206 may include calculating a Euclidean distance at 224, or other similarity/dissimilarity measurement between contacts and known objects.

Euclidean distance may be derived from physical locations of contacts and objects and corresponding shape and size descriptors. Each Universal Transverse Mercator coordinate and the exemplary six descriptors may be treated as separate dimensions, resulting in an eight-dimensional distance calculation. If the eight-element vector corresponding to a contact is u, and the eight-element vector corresponding to a known object is V, then the scalar distance between the contact and the object is:

$$d = \|u - v\| = \sqrt{\sum_{i=1}^{8}(u_i - v_i)^2} \quad (21)$$

A contact may correlate with an object when the distance is less than a maximum tolerable distance, $\epsilon$. When a contact is physically distant from an object, this tolerance may be exceeded, and there is no correlation, even if only one object and one contact are in the greater vicinity. $\epsilon$ represents a physical correlation window. In situations where multiple contacts and/or objects are within $\epsilon$ distance of each other physically, the differences in shape and size dimensions may become distinguishing factors. In other words, shape and size characteristics may be used as effective tie-breakers when physical distance is ambiguous.

(c) Optimal Assignment

Change detection at 206 may include an optimal assignment at 226, which may include a many-to-many correlation based on the distance metric, $\epsilon$, calculated between each contact and each object.

Many-to-many correlation of contacts to objects may be a relatively complex problem. It may, however, be viewed as a classic worker-task assignment problem with a scalar cost metric. In a worker-task problem, specific tasks may be assigned to specific workers based on corresponding abilities to perform the tasks, which may minimize the overall cost to complete the tasks.

Optimal assignment at 226 may include assigning contacts to objects so as to minimize a total N-dimensional distance. In cases where multiple contacts could be assigned to multiple objects, the formulation of the descriptor vector and the calculation of distance may dictate that a combination of physical distance, shape, and size determines the assignment.

Optimal assignment was published over 50 years ago by Kuhn (References 23 and 24) in what is now known as the Hungarian Algorithm. The original algorithm was modified by Munkres (Reference 25), and the current method is now often called the Kuhn-Munkres Algorithm or, simply, the Munkres Algorithm. The method was further modified by Burgeois and Lassalle (Reference 26) for application to rectangular matrices (for example, when the number of detections and pre-existing tracks are different). Optimal assignment at 226 may include one or more of the above, including the Burgeois and Lassalle adaptation. References 23, 24, 25, and 26 are incorporated herein by reference in their entireties.

Optimal assignment at 226 may be implemented in accordance with Reference 27, which is incorporated herein by reference in its entirety. The following description is taken almost directly from this reference. The problem begins with a P×Q matrix, where P contacts represent rows, Q objects represent columns, and each element of the matrix represents the distance between the corresponding contact and object. The algorithm consists of the following steps:

Preliminaries
  The rows and columns of the matrix may be marked and referred to as covered. The zeros may be marked with a star (*) or a prime (').
  a. Initially, no lines are covered and no zeros are starred or primed.
  b. Let k=min(P,Q).
  c. If the P>Q, go to step (f) of the preliminaries.
  d. For each row, subtract the smallest element from each element in the row.
  e. If P<Q, go to Step 1.
  f. For each column, subtract the smallest element from each element in the column.
Step 1
  a. Find a zero, Z, of the matrix.
  b. If there is no starred zero in its row or its column, star the zero (Z*).
  c. Repeat step 1(b) for all zeros of the matrix.
  d. Go to Step 2.
Step 2
  a. Cover every column containing a starred zero (Z*).
  b. If k columns are covered, the locations of the (Z*) form the row-column associations, and the algorithm is finished.
  c. Otherwise, go to Step 3.
Step 3
  a. Choose an uncovered zero and prime it to (Z').
  b. If there is no starred zero (Z*) in the row of (Z'), go to Step 4.
  c. If there is a starred zero (Z*) in the row of (Z'), cover this row and uncover the column of (Z*).
  d. Repeat Step 3 until all zeros are covered.
  e. Go to Step 5.
Step 4
  a. The sequence of alternating starred and primed zeros is:
    (1) Let $Z_0$ denote the uncovered (Z'). If there is no (Z*) in the column of $Z_0$, go to Step 4(a6).
    (2) Let $Z_1$ denote the (Z*) in the column of $Z_0$.
    (3) Let $Z_2$ denote the (Z') in the row of $Z_1$.
    (4) Continue performing Step 4(a2) and Step 4(a3) [in Step 4(a2), look in the column of $Z_2$ instead of $Z_0$] until a $Z_2$ with no (Z*) in its column is found.
    (5) Unstar each starred zero of the sequence.
    (6) Star each primed zero of the sequence.
  b. Erase all primes from primed zeros and uncover every line.
  c. Go to Step 2.
Step 5
  a. Find the smallest uncovered element in the matrix and call it h; h will be positive.
  b. Add h to each covered row.
  c. Subtract h from each uncovered column.
  d. Return to Step 3 without altering stars, primes, or covered lines.

By the end of the process, there will be k "starred zeros," which represent the contact-object correlations. Any contact that remains uncorrelated represents a potential new object. These are detected changes and mark the output of the automation algorithm. An operator may be alerted to these contacts and may determine whether they represent actual objects or are false alerts. Decisions of the operator may be incorporated by the algorithm and used for object management, such as described below.

5. Object Management

Change detection information obtained from a new survey may be incorporated within repository of known objects 108, which may be performed off-line or subsequent to a survey.

Exemplary off-line processing of change detection information is described below with reference to method 300 in FIG. 3.

At 302, an indication of detected contacts and corresponding contact-object correlations associated with a new survey are received. The indications may be generated in accordance with change detection at 206 in FIG. 2.

During real-time operation, a log may be maintained with each detected contact and all contact object correlations. The log may be received at 302.

At 304, one or more actions are taken in response to results of the correlations. Correlation results may include one or more of:

(1) a contact correlates to a known object;
(2) none of the contacts correlate to a particular known object; and
(3) a particular contact does not correlate to any known object.

Case 1 may correspond to a situation where a previously observed or known object is observed during a new survey. At 306, based on new observation information, new predicted positions of the objects may be calculated and stored.

Objects may be classified as tentative objects or confirmed objects. Classification may be based at least in part on a prior number of prior surveys in which the object was detected. At 308, where the object is currently identified as a tentative object, a corresponding confidence or track metric may be increased at 310. At 312, if the track metric exceeds a confirmation threshold, the object may be re-classified as a confirmed object at 314.

Case 2 may correspond to a situation where a known object is not detected in a subsequent survey. At 318, the object may be marked as unseen, and the track metric of the object may be decreased. At 320, when the track metric of the object falls below a drop threshold, at 322 the object may be removed from repository 108 in FIG. 1.

Case 3 may correspond to a new or previously undetected object. At 324, a new object may be configured in repository 108 to represent the uncorrelated contact. A corresponding track metric may be initialized to identify the new object as a tentative object. Subsequent observations of the contact may improve the track metric, and may lead to promotion of the corresponding object to a confirmed object.

Case 3 may be invoked to initialize repository 108, and may be invoked to re-initialize repository 108, or a portion thereof in response to an event, such as a severe weather event that may substantially disturb a corresponding survey area.

Case 3 contacts may be presented to an operator in real-time. Where the operator validates a case 3 contact, the contact may be subsequently added to repository 108 as a confirmed object. Where the operator invalidates a case 3 contact, the contact may be added to repository 108 as a potentially invalid or false object. A subsequently detected contact that correlates to the object may be automatically identified as a false object, which may preclude presentation of the contact to the operator.

6. Experimental Results

Experimental results are presented below.

Figure 13:
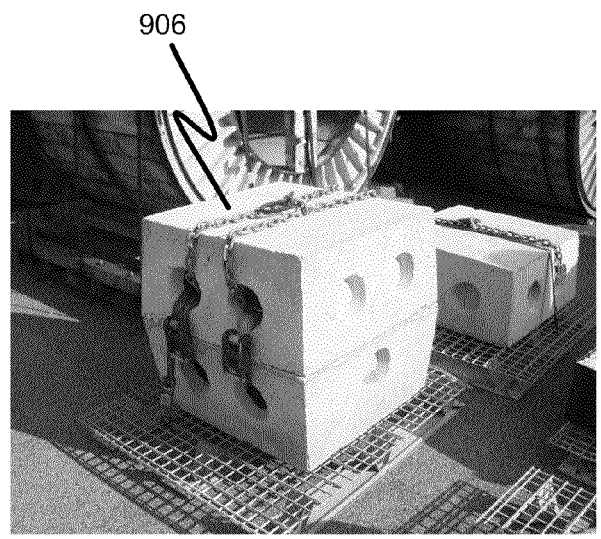
FIG. 13 is an image of a concrete block used as a test target during sea tests.

FIG. 13 is an image of a concrete block 1302 used as a test target during sea tests. Concrete block 1302 is hollow and measures 30 inches on a side.

A first survey of an area was performed at sea in December, 2006. Block 1302 was not present in the area during the first survey. Block 1302 was subsequently placed in the survey area.

A second survey was conducted in mid-August, 2007, subsequent to the placement of block 1302 in the area. A third survey was conducted in late-August, 2007, with block 1302 present in the area.

Figure 14:
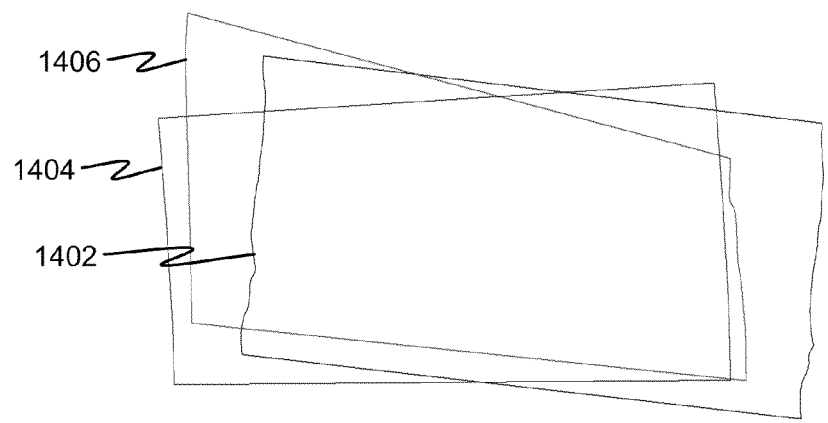
FIG. 14 is a graphic depiction of geo-registered search volumes or area segments corresponding to the sea tests.

FIG. 14 is a graphic depiction of geo-registered search volumes or area segments 1402, 1404, and 1406, corresponding to the December 2006, the mid-August 2007, and the late-August 2007 surveys, respectively.

Data from the December 2006 survey represents baseline data to which data from the August 2007 surveys may be compared.

Although segments 1402, 1404, and 1406 differ from one another with respect to aspect angle to any particular point, the acoustic data show little significant variation.

Figure 15:
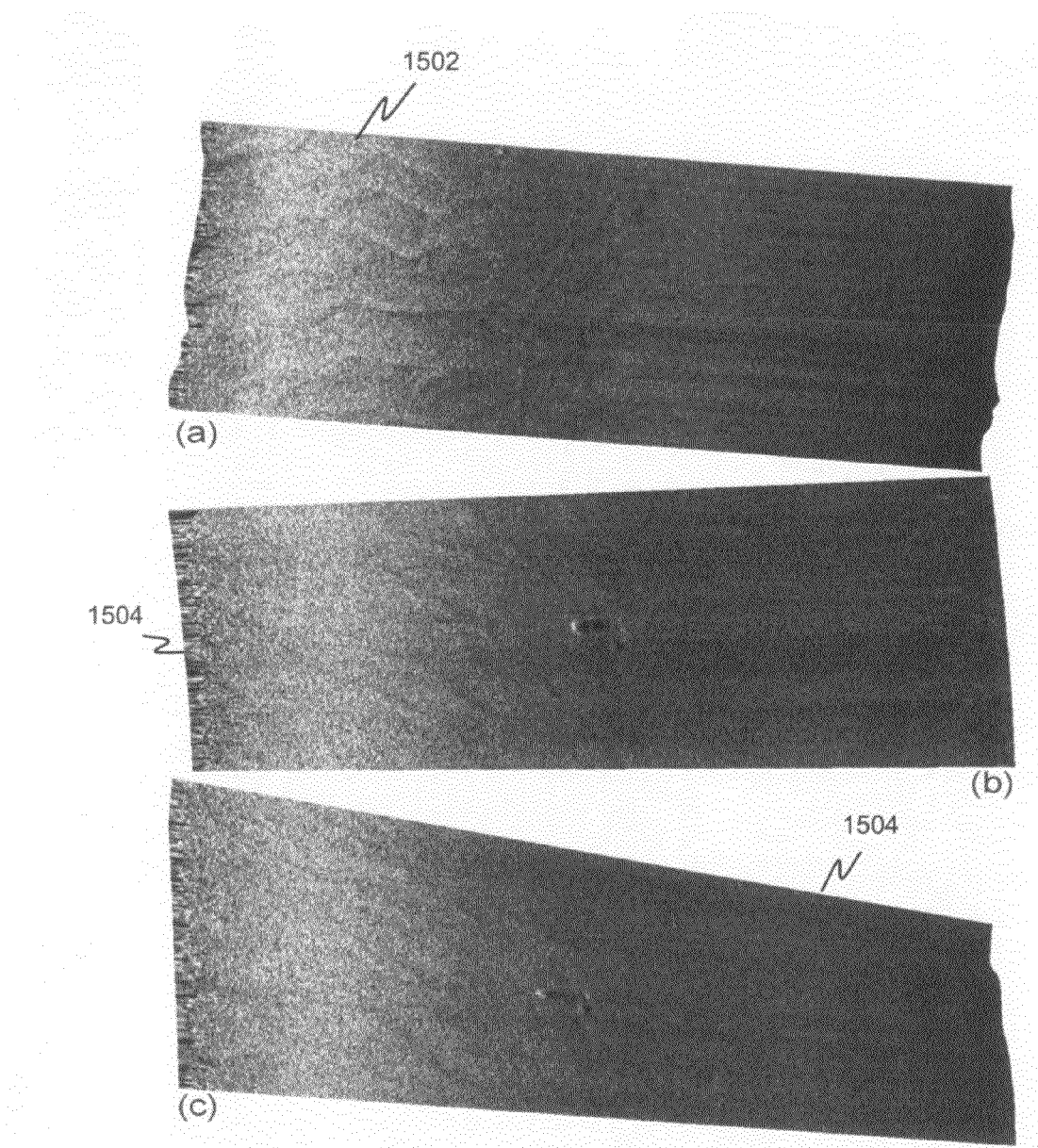
FIG. 15 is a graphic depiction of geo-registered acoustic data corresponding to the area segments of FIG. 14.

FIG. 15 is a graphic depiction of geo-registered acoustic data 1502, 1504, and 1506, corresponding to segments 1402, 1404, and 1406, respectively. The geo-registered acoustic data of FIG. 15 was generated by a 600-kHz band of the sensor.

In the experimental results, reported positions of block 1302 in the two August 2007 passes differ by approximately 2.07 meters due to errors in the sensor position measurements.

Geo-registered acoustic data 1502, 1504, and 1506 were processed as described in accordance with method 200, as described below.

Figure 16:
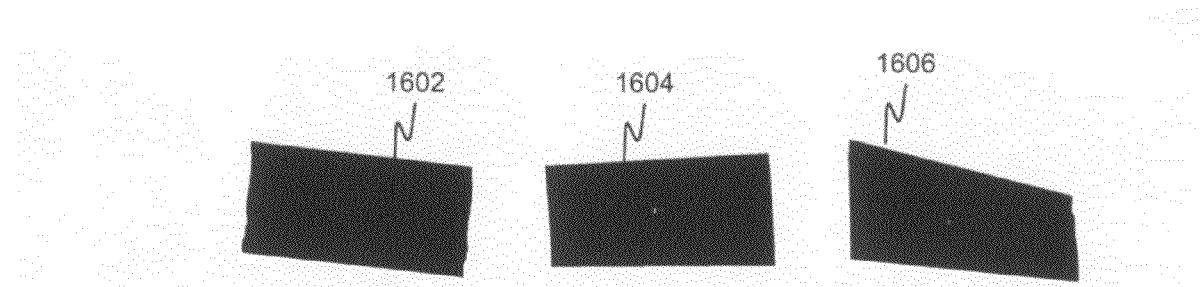
FIG. 16 is a graphic depiction of SVDD decision statistics, after thresholding, corresponding to the geo-registered acoustic data of FIG. 15.

FIG. 16 is a graphic depiction of SVDD decision statistics 1602, 1604, and 1606, after thresholding, corresponding to geo-registered acoustic data 1502, 1504, and 1506. No anomalies were identified in the December segment 1602, while a cluster of anomalies is found in each of the August segments 1604 and 1606, corresponding to the physical location of block 1302. Block 1302 was thus detected in segments 1604 and 1606. The detection of block 1302 in the August data but not in the December data confirms that the change was detected.

FIG. 17 is a graphic depiction of boundaries 1702 and 1704 generated from anomaly clusters, raw contacts, or SVDD decision statistics 1604, and 1606 of FIG. 16, respectively, using the multilevel B-spline procedure and the boundary determination procedure disclosed above.

Boundaries 1702 and 1704 are similar to one another. Descriptor vectors calculated for boundaries 1702 and 1704, including length (L), width (W), and the (x, y) coordinates, are given in Table 1, below. For illustration purposes, the coordinates of the first contact are taken as the origin. Excluding the coordinates and treating the other six descriptors as elements of a vector, $\overline{V}$, for each segment allows an angle of separation to be calculated by:

$$\theta = \cos^{-1}\left(\frac{\overline{V}_1 \cdot \overline{V}_2}{|\overline{V}_1||\overline{V}_2|}\right) \tag{22}$$

This angle describes the similarity of two boundaries in shape and size. Identical boundaries will have an angle of zero.

TABLE 1

Descriptor Vectors for Each Detected Object

| Descriptor | Symbol | First Segment | Second Segment |
|---|---|---|---|
| Convexity | K | 0.9553 | 0.9490 |
| Proportionality | P | 0.2498 | 0.1913 |
| Compactness | C | 0.6019 | 0.5515 |
| Circularity | V | 0.0069 | 0.0088 |
| Length | L | 0.3531 | 0.2830 |
| Width | W | 0.6775 | 0.5919 |

TABLE 1-continued

Descriptor Vectors for Each Detected Object

| Descriptor | Symbol | First Segment | Second Segment |
|---|---|---|---|
| x-coordinate | x | 0 | 1.8277 |
| y-coordinate | y | 0 | 0.9625 |

Because the detected (and cataloged) object from the first segment is the only object in the vicinity for the second segment, the correlation is obvious. From Equation (21), the total eight-dimensional separation is 2.07 units and the angular separation calculated from Equation (22) is 4.2°. Thus, even if there were more database objects in the area, the correlation would be correct for any objects that were at least 2.07 meter away from the concrete block. For objects closer than 2.07 m, the correlation would still be correct provided the angular separation between the first segment detection and the confusable object is more than 4.2°.

Data quality may be affected by one or more factors, such as consistency of sensor deployment and accuracy of sensor localization, or data registration. For example, where the acoustic background is relatively unchanged between surveys, false detections may be reduced. More frequent surveys may minimize effects of naturally occurring changes. Other factors may include:

Accuracy and consistency of survey paths relative to one another;

Using high-accuracy navigation instruments for Global Positioning System (GPS) position and heading;

Using a platform with dynamic positioning to more accurately follow the prescribed route;

Mounting the sonar to the hull of the ship to eliminate positioning errors due to ultra-short baseline (USBL) multipath interference;

Operating during calm conditions to minimize heading, pitch, and roll changes;

Operating during low-traffic periods to avoid unnecessary maneuvering; and

Placing detectable markers at known positions along the channel to enable software correction of misalignments.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 18:
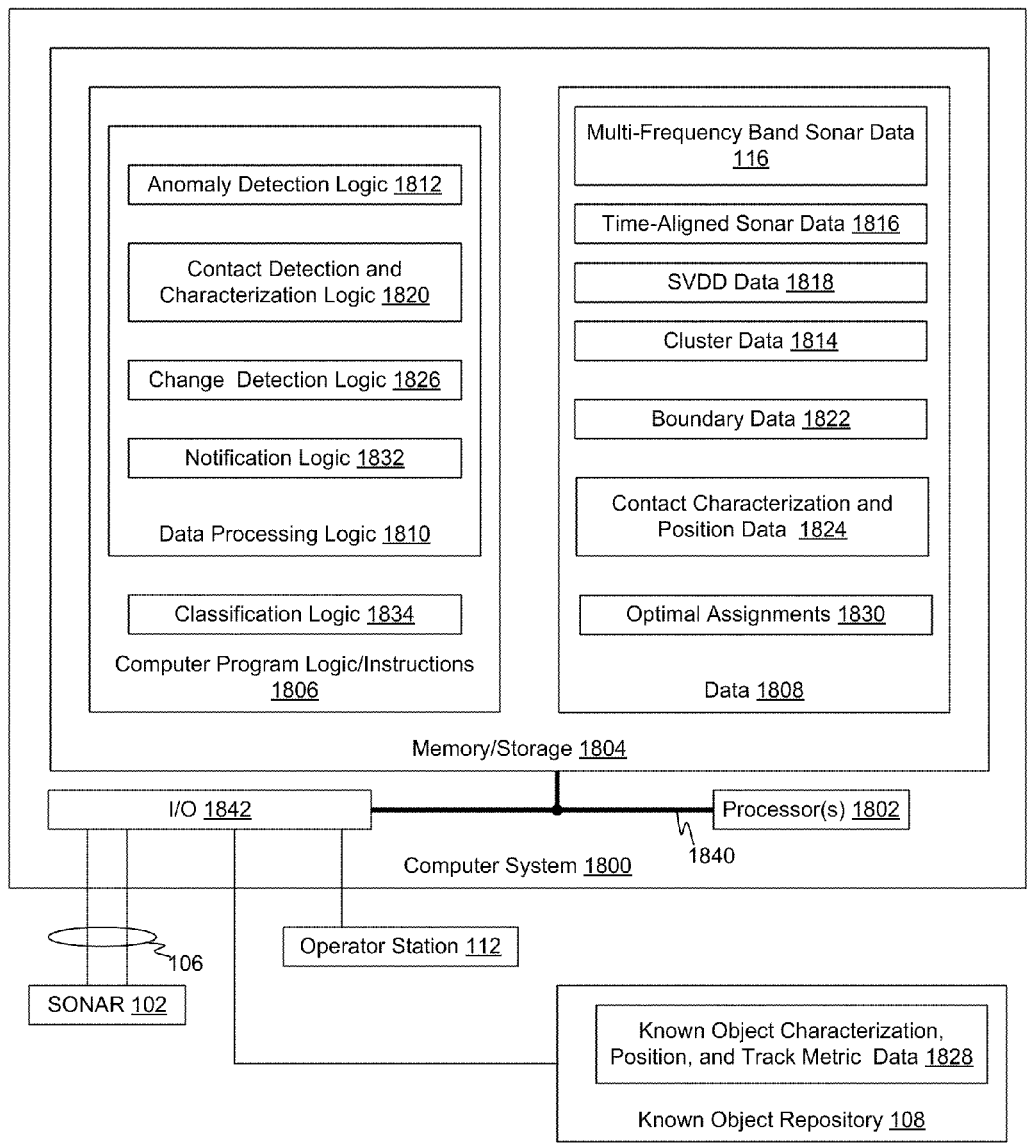
FIG. 18 is a block diagram of an exemplary computer system.

FIG. 18 is a block diagram of an exemplary computer system 1800, including one or more computer instruction processing units, illustrated here as a processor 1802, to execute computer program product logic, also known as instructions, code, and software.

Computer system 1800 includes memory/storage 1804, including a computer readable medium having computer program product logic or instructions 1806 stored thereon, to cause processor 1802 to perform one or more functions in response thereto.

Memory/storage 1804 further includes data 1808 to be used by processor 1802 in executing instructions 1806, and/or generated by processor 1802 in response to execution of instructions 1806.

In the example of FIG. 18, logic 1806 includes data processing logic 1810, which may include logic to cause processor 1802 to implement method 200, or portions thereof.

Data processing logic 1810 may include anomaly detection logic 1812 to cause processor 1802 to generate cluster data 1814 from multi-frequency band sonar data 116, such as described in one or more examples above. Anomaly detection logic 1810 may include one or more of feature space logic, SVDD logic, threshold logic, and cluster logic, to cause processor 1802 to generate one or more of time-aligned sonar data 1816 from sonar data 116, to generate SVDD data 1818 from time-aligned data 1816, and to generate cluster data 1814 from SVDD data 1818, such as described above with respect to FIG. 2.

Data processing logic 1810 may include contact detection and characterization logic 1820 to cause processor 1802 to identify and characterize contacts from cluster data 1814. Contact detection and characterization logic 1820 may include one or more of B-spline interpolation logic, boundary determination logic, and characterization logic, to cause processor 1802 to determine boundary data 1822 from cluster data 1814 and to generate contact characterization data 1824 from boundary data 1822, such as described above with respect to FIG. 2.

Data processing logic 1810 may include change detection logic 1826 to cause processor 1802 to compare contact characterization data 1824, including corresponding position information, with characterization and position data of known objects 1828, to correlate contacts with known objects based on the comparisons, and to generate optimal assignments 1830, such as described above with respect to FIG. 2. Change detection logic 1826 may include Euclidean distance logic to calculate Euclidean distances between contacts and objects based on multi-dimensional characterization data 1824, and may include optimal assignment logic to correlated contacts with objects to minimize an overall distance metric.

Change detection logic 1810 may include notification logic 1832 to notify an operator in real-time of contacts that do not correlate to known objects.

Logic 1806 may further includes classification logic 1834, which may include logic to cause processor 1802 to implement method 300, or portions thereof. Classification logic 1812 may include logic to cause processor 1802 to manage known objects 1828, including to add new contacts, to delete old objects, and to update track metrics associated with objects, such as described above with respect to FIG. 3.

Execution of logic 1806, or portions thereof, may be distributed amongst a plurality of computer systems and/or processor cores, such as to optimize processing resources. For example, computations may include matrix-based operations that may be distributed across multiple processors or processor cores, which may be configured in a parallel processing architecture.

Although actual processor utilization is data-dependent, given the data rates of the exemplary EdgeTech 4200 side-scan sonar, eight processors, such as Intel Pentium 4, 3.6-GHz processors, may be sufficient for real-time operation. Processor 1802 may thus include, for example, dual quad-cores.

Computer system 1800 may include a communications infrastructure 1840 to communicate amongst components of computer system 1800.

Computer system 1800 may include an input/output controller 1842 to communicate with one or more of sonar 102, repository 108 operator station 128, repository 108, and other systems, over one or more communication channels or links, which may include a network communication channel, and which may include an Internet communication link.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A computer program product including a computer readable medium having computer program logic stored therein, the computer program logic comprising:
   logic to cause a processor to receive multiple frequency band sonar data corresponding to an underwater survey of an area, wherein at least a portion of the multiple frequency band data has a sampling rate that differs from another portion of the multiple frequency band data;
   time-align logic to cause the processor to time-align the multiple frequency band sonar data;
   logic to cause the processor to convert the time-aligned sonar data to multi-dimensional feature vectors, each feature vector including corresponding multiple frequency band amplitude information and geographical position information;
   data processing logic to cause the processor to convert the feature vectors to support vector data description (SVDD) data points, to generate a SVDD hypersphere surface from SVDD data points associated with background portions of the area, to identify clusters of SVDD data points that fall outside of the SVDD hypersphere surface by at least a first threshold amount as anomalies, to identify a cluster as a contact when at least a subset of the corresponding SVDD data points fall outside of the SVDD hypersphere surface by at least a second threshold amount, to characterize the contacts based on the SVDD statistics, and to compare the contact characterizations to characterizations of objects previously identified in the area.

2. The computer program product of claim 1, wherein the data processing logic includes:
   logic to cause the processor to determine boundaries of each of a plurality of contacts from the corresponding SVDD data points, and to characterize each of the contacts with respect to a plurality of features associated with the corresponding boundaries, including one or more features that are based on locations of points on the corresponding boundary relative to other points on the boundary.

3. The computer program product of claim 2, wherein the data processing logic further includes:
   logic to cause the processor to construct a perimeter of each of a plurality of contacts from the corresponding SVDD data points in accordance with a multi-level B-spline interpolation; and
   logic to cause the processor to determine each of the contact boundaries as a convolution of the contact perimeters and a circularly shaped kernel.

4. The computer program product of claim 2, wherein the data processing logic further includes:
   logic to cause the processor to characterize the contacts with respect to size and shape, including one or more of convexity, principal components, compactness, and circularity based on the corresponding boundaries.

5. The computer program product of claim 4, wherein the data processing logic further includes:
   logic to cause the processor to calculate Euclidean distances between the contacts and the objects based on corresponding multi-dimensional characterizations; and
   logic to cause the processor to determine an optimal assignment of at least a portion of the contacts to at least a portion of the objects from the Euclidean distances.

6. The computer program product of claim 1, wherein the time-align logic includes:
   logic to cause the processor to re-sample the multiple frequency band sonar data at a common sample rate.

7. The computer program product of claim 1, wherein the computer program logic further includes:
   logic to cause the processor to identify a contact as a tentative object when the contact does not correlate to any of the objects;
   logic to cause the processor to increase a confidence metric associated with an object when a contact correlates to the object; and
   logic to cause the processor to decrease the confidence metric associated with an object when the object does not correlate to any contacts.

8. The computer program product of claim 1, wherein the computer program logic further includes:
   logic to cause the processor to notify an operator station in real-time when a contact does not correlate to any of the objects.

9. A method, comprising:
   receiving multiple frequency band sonar data corresponding to an underwater survey of an area, wherein at least a portion of the multiple frequency band data has a sampling rate that differs from another portion of the multiple frequency band data;
   time-aligning the multiple frequency band sonar data;
   converting the time-aligned sonar data to multi-dimensional feature vectors, each feature vector including corresponding multiple frequency band amplitude information and geographical position information;
   converting the feature vectors to support vector data description (SVDD) data points;
   generating a SVDD hypersphere surface from SVDD data points associated with background portions of the area;
   identifying clusters of SVDD data points that fall outside of the SVDD hypersphere surface by at least a first threshold amount as anomalies;
   identifying a cluster as a contact when at least a subset of the corresponding SVDD data points fall outside of the SVDD hypersphere surface by at least a second threshold amount;
   characterizing the contacts based on the SVDD statistics; and
   comparing the contact characterizations to characterizations of objects previously identified in the area.

10. The method of claim 9, wherein the characterizing includes:
- determining boundaries of each of a plurality of contacts from the corresponding SVDD data points; and
- characterizing each of the contacts with respect to a plurality of features associated with the corresponding boundaries, including one or more features that are based on locations of points on the corresponding boundary relative to other points on the boundary.

11. The method of claim 10, wherein the determining boundaries includes:
- constructing a perimeter of each of a plurality of contacts from the corresponding SVDD data points in accordance with a multi-level B-spline interpolation; and
- convolving each of the contact perimeters with a circularly shaped kernel.

12. The method of claim 9, wherein the characterization includes:
- characterizing the contacts with respect to size and shape, including one or more of convexity, principal components, compactness, and circularity based on the corresponding boundaries.

13. The method of claim 9, wherein the comparing includes:
- calculating Euclidean distances between the contacts and the objects based on corresponding multi-dimensional characterizations; and
- determining an optimal assignment of at least a portion of the contacts to at least a portion of the objects from the Euclidean distances.

14. The method of claim 9, wherein the time-aligning includes:
- re-sampling the multiple frequency band data at a common sample rate.

15. The method of claim 9, further including:
- identifying a contact as a tentative object when the contact does not correlate to any of the objects;
- increasing a confidence metric associated with an object when a contact correlates to the object; and
- decreasing the confidence metric associated with an object when the object does not correlate to any contacts.

16. The method of claim 10, further including:
- notifying an operator station in real-time when a contact does not correlate to any of the objects.

17. A system, comprising:
- means for receiving multiple frequency band sonar data corresponding to an underwater survey of an area, wherein at least a portion of the multiple frequency band data has a sampling rate that differs from another portion of the multiple frequency band data;
- means for time-aligning the multiple frequency band sonar data;
- means for converting the time-aligned sonar data to multi-dimensional feature vectors, each feature vector including corresponding multiple frequency band amplitude information and geographical position information;
- means for converting the feature vectors to support vector data description (SVDD) data points;
- means for generating a SVDD hypersphere surface from SVDD data points associated with background portions of the area;
- means for identifying clusters of SVDD data points that fall outside of the SVDD hypersphere surface by at least a first threshold amount as anomalies;
- means for identifying a cluster as a contact when at least a subset of the corresponding SVDD data points fall outside of the SVDD hypersphere surface by at least a second threshold amount;
- means for characterizing the contacts based on the SVDD statistics; and
- means for comparing the contact characterizations to characterizations of objects previously identified in the area.

18. The system of claim 17, wherein the means for characterizing includes:
- means for determining boundaries of each of a plurality of contacts from the corresponding SVDD data points; and
- means for characterizing each of the contacts with respect to a plurality of features associated with the corresponding boundaries, including one or more features that are based on locations of points on the corresponding boundary relative to other points on the boundary.

19. The system of claim 18, wherein the means for determining boundaries includes:
- means for constructing a perimeter of each of a plurality of contacts from the corresponding SVDD data points in accordance with a multi-level B-spline interpolation; and
- means for convolving each of the contact perimeters with a circularly shaped kernel.

20. The system of claim 17, wherein the means for comparing includes:
- means for calculating Euclidean distances between the contacts and the objects based on corresponding multi-dimensional characterizations; and
- means for determining an optimal assignment of at least a portion of the contacts to at least a portion of the objects from the Euclidean distances.

* * * * *